(12) United States Patent
McCormick et al.

(10) Patent No.: US 9,747,547 B2
(45) Date of Patent: *Aug. 29, 2017

(54) HARDWARE ENHANCEMENTS TO RADIAL BASIS FUNCTION WITH RESTRICTED COULOMB ENERGY LEARNING AND/OR K-NEAREST NEIGHBOR BASED NEURAL NETWORK CLASSIFIERS

(71) Applicant: in2H2, Folsom, CA (US)

(72) Inventors: Bruce Kent McCormick, Granite Bay, CA (US); William Harry Nagel, Arroyo Grande, CA (US); Christopher John McCormick, Santa Barbara, CA (US); Mickey Lee Fandrich, Oregon City, OR (US); Vardan Movsisyan, Yerevan (AM); Matthew McCormick, Folsom, CA (US)

(73) Assignee: in2H2, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,764

(22) Filed: Jan. 21, 2016

(65) Prior Publication Data

US 2016/0155048 A1 Jun. 2, 2016

Related U.S. Application Data

(63) Continuation-in-part of application No. 14/060,426, filed on Oct. 22, 2013, now Pat. No. 9,269,041.

(51) Int. Cl.
   *G06N 3/063* (2006.01)
   *G06N 3/04* (2006.01)
   *G06N 3/02* (2006.01)

(52) U.S. Cl.
   CPC ............ *G06N 3/063* (2013.01); *G06N 3/04* (2013.01); *G06N 3/02* (2013.01)

(58) Field of Classification Search
   None
   See application file for complete search history.

(56) References Cited

U.S. PATENT DOCUMENTS 9,269,041 B2 *  2/2016  McCormick .............. G06N 3/04
2011/0307228 A1  12/2011  Kasabov
(Continued)

FOREIGN PATENT DOCUMENTS

KR  1020130037734 A   4/2013
WO  WO-2010080611 A2  7/2010
WO  WO-2015061244 A1  4/2015

OTHER PUBLICATIONS

"CogniMem Technology Reference Guide," Version 2.2.1 (Revised Jul. 10, 2012) retrieved from https://www.yumpu.com/en/document/view/42513706/cognimem-technology-reference-guide.*
(Continued)

*Primary Examiner* — Kakali Chaki
*Assistant Examiner* — Brian M Smith
(74) *Attorney, Agent, or Firm* — Schwegman Lundberg & Woessner, P.A.

(57) ABSTRACT

A nonlinear neuron classifier comprising a neuron array including a plurality of neuron chips each including a plurality of neurons of variable length and variable depth, the chips processing input vectors of variable length and variable depth that are input into the classifier for comparison against vectors stored in the classifier, wherein an NSP flag is set for a plurality of the neurons to indicate that only that plurality of neurons is to participate in the vector calculations. A virtual content addressable memory flag is set for certain of the neuron chips to enable functions including fast readout of data from the chips. Results of vector calculations are aggregated for fast readout for a host computer interfacing with the classifier.

21 Claims, 24 Drawing Sheets

(56) References Cited

U.S. PATENT DOCUMENTS

2012/0303564 A1 11/2012 Dobson et al.
2014/0344203 A1 11/2014 Ahn
2015/0112910 A1 4/2015 Mccormick et al.

OTHER PUBLICATIONS

Somnath Kayal, "Finding the Maximum and Minimum using Divide and Conquer Strategy," blog post on Aug. 27, 2012, http://somnathkayal.blogspot.com/2012/08/finding-maximum-and-minimum-using.html.*
Omondi, A. et al., "PFGA implementation of neural networks" vol. 365. Springer, 2006.*
Dias, F. et al., "Artificial neural networks: a review of commercial hardware," Engineering Applications of Artificial Intelligence, vol. 17 No. 8 (2004) pp. 945-952.*
"U.S. Appl. No. 14/060,426, Notice of Allowance mailed Oct. 15, 2015", 11 pgs.
"CM1K hardware User's Manual", CogniMem® Technologies, Inc. Version 2.5.1, 59 pgs.
"International Application Serial No. PCT/US2014/061451, International Preliminary Report on Patentability mailed Feb. 12, 2016", 5 pgs.
"International Application Serial No. PCT/US2014/061451, International Search Report mailed Jan. 20, 2015", 3 pgs.
"International Application Serial No. PCT/US2014/061451, Written Opinion mailed Jan. 20, 2015", 7 pgs.
Janik, Przemyslaw, "Automated classification of power-quality disturbances using SVM and RBF networks", IEEE Transactions on Power Delivery, vol. 21, No. 3, (Jul. 2006).
Sui, et al., "Restricted Coulomb Energy (RCE) Neural Network System for Hand Image Segmentation", Canadian Conference on Computer and Robot Vision, (2011), 271-277.
"International Application Serial No. PCT/US2017/014460, International Search Report dated Apr. 26, 2017", 3 pgs.
"International Application Serial No. PCT/US2017/014460, Written Opinion dated Apr. 26, 2017", 6 pgs.

* cited by examiner

EXAMPLE BITS COMPARED FROM ALL VECTORS (WIRE OR'D)

BIT POSITIONS
(BIT-9 IS HIGHEST ORDER BIT)
(COMPARISONS START FROM HIGHEST ORDER BIT)

| 9 | 8 | 7 | 6 | 5 | 4 | 3 | 2 | 1 | 0 | NEURONS |
|---|---|---|---|---|---|---|---|---|---|---------|
| 1 | 1 | 1 | 0 | 0 | 1 | 1 | 0 | 1 | 0 | DISTANCE 1 |
| 1 | 1 | 1 | 0 | 0 | 1 | 0 | 0 | 1 | 1 | DISTANCE 2 |
| 1 | 1 | 1 | 0 | 0 | 1 | 0 | 1 | 0 | 1 | DISTANCE 3 |
| 1 | 1 | 1 | 0 | 0 | 1 | 1 | 1 | 0 | 0 | DISTANCE 4 |

NOTE: A "0" REPRESENTS A LOW SIGNAL, A "1" REPRESENTS A HIGH SIGNAL.

STEP 1. EACH NEURON PLACES ITS HIGHEST ORDER DISTANCE BIT ON THE BUS (10 BITS SHOWN). IF ALL 1's (HIGH) OR ALL 0's (LOW), GO TO NEXT BIT.

STEP 2. IF BITS ARE DISSIMILAR, THE ONE (S) WITH A "0" CONTINUE TO PARTICIPATE IN THE COMPARISON. CONTINUE WITH STEPS 1 AND 2 UNTIL ONE VECTOR DISTANCE REMAINS (SMALLEST).

STEP 2A. WHENEVER NEURON(S) DROP OUT, KEEP TRACK OF WHICH BIT IT DROPPED OUT ON

STEP 3. AFTER FINDING THE LOWEST DISTANCE, RETURN TO THE POINT WHERE ONE OR MORE DISTANCES DROPPED OUT AND START THE NEXT SEARCH FROM THERE, ELIMINATING THE NEED TO RE-START FROM THE HIGHEST ORDER BIT TO FIND THE SECOND CLOSET, THIRD, ETC.

IN THE ABOVE EXAMPLE:
- ON THE 7TH COMPARISON (BIT-3, AFTER 7 CLOCKS), THE NEURONS WITH DISTANCES 1 AND 4 WILL DROP OUT (FLAG)
- ON THE 8TH COMPARISON (BIT-2, AFTER 8 CLOCKS), THE NEURON WITH DISTANCE 3 WILL DROP OUT AND FLAG
- THE NEURON WITH DISTANCE 2 IS THE LOWEST AND WINS
- THE ALGORITHM WILL RETURN TO THE NEURON WITH DISTANCE 3 FLAG FOR THE NEXT LOWEST
- THE ALGORITHM WILL THEN GO TO THE NEURONS WITH DISTANCES 1 AND 4 AND RESUME ON THE 8TH COMPARISON ( RESUME ON BIT-2 )

HARDWARE ENHANCEMENTS TO RADIAL BASIS FUNCTION WITH RESTRICTED COULOMB ENERGY LEARNING AND/OR K-NEAREST NEIGHBOR BASED NEURAL NETWORK CLASSIFIERS

RELATED PRIORITY APPLICATION

This application is a continuation-in-part of, and claims the benefit of priority to, U.S. application Ser. No. 14/060,426, filed Oct. 22, 2013, which is incorporated herein by reference in its entirety.

TECHNICAL FIELD

This disclosure relates to hardware embodiments that improve the utility and performance of neural network algorithms such as Radial Basis Function (RBF) with Restricted Coulomb Energy (RCE) learning and/or k-Nearest Neighbor (kNN) in a digital data processing environment. These improvements may include modifications that expand RBF/RCE, kNN based neural networks to include, for example, support for probabilistic computations, additional neural network algorithms such as K-Means, and recommender algorithm features, all of which may be embedded on chip. These improvements may also include hardware support for filing systems, swapping in and out meta data or vectors of data to improve use in a multi-purpose/multi-user environment. Further, these improvements may also include support for virtual Content-Addressable Memory (CAM) operations, selective participation of neurons based upon neuron-specific criteria, results aggregation from an array of devices, and system-level aggregation of status signals.

BACKGROUND

Machine learning and recognition is a field of study and applications whereby machines, in the form of dedicated hardware, computing software or combinations thereof, learn the key features and characteristics of objects. The objects may be physical in nature, examples of which are digitized images of automobiles or human faces. The objects may also be non-physical in nature, examples of which are sets of digital information representing the shopping information of customers. The characteristics of the objects are provided to the machine in the form of digital arrays of data that are known as feature vectors, or simply "vectors". Individual elements of the feature vectors are known as components. The machine is capable of holding many such feature vectors, and may use one of many algorithms from the field of neural networks during learning to assign the feature vectors to a class of objects. The machine may be capable of holding and analyzing un-related sets of data, with the data sets known as a "context". For example, it may contain a group, or context of feature vectors related to automobiles and another context containing feature vectors related to consumer spending habits. The Machine could direct new feature vectors requiring analysis to the appropriate context. A context may be further sub-divided into categories.

Once the machine has learned an appropriate number of features, the characteristics of new objects are given to the machine in the form of vectors for classification; that is, to determine if the new object belongs to a class of previously learned objects. The machine may use one or more algorithms from the field of neural networks to determine the closeness (conversely, distance) of a new feature vector to the learned feature vectors. The distance between a learned vector and a new observed vector is often performed using a form of Euclidian or Manhattan distance calculation and results aggregation. One example distance calculation is the Manhattan L1 norm distance, also known as the "taxi cab" distance. Another distance calculation is the Euclidian L2 norm. A third example is Lmax or Loc. A machine performing this analysis may be known as a classifier.

For machine learning to be increasingly practical in today's digital environment it needs to be conducive to various data widths and resolutions, support averaging and probabilistic calculations, as well as have the capability to swap in and out "files" (or classes of learned data) to support multiuser and/or multipurpose application scenarios. The machine may also be required to perform these tasks at very high rates of speed.

Hardware implementations of neural network algorithms saw significant interest in the 1980's but predominantly took the approach of weights in a multi-layer perceptron. Many of these solutions were analog in nature. Recent efforts in this space have rekindled an interest in analog and "spiking neurons" that try to conform very closely to biological brain cells. These approaches—using weights in a multi-layer perceptron and spiking neurons—are a different approach from that of the 1980s, may also be digital in nature, but are different than the Radial Basis Function (RBF) and Restricted Coulomb Energy (RCE) algorithms approaches. IBM subsequently patented and pursued early generations of a hardware implementation for the base RBF/RCE/kNN architecture. The more practical approach disclosed herein may be well suited for heterogeneous environments, or in some cases, standalone environments.

Disclosed herein are circuits and functions that will enhance an RBF/RCE/kNN based architecture. Their usefulness in a general computing environment performing digital memory based "fuzzy" operations in a hardware implementation offers significant performance improvements made by emulating the important computational attributes of neural networks without the issues of trying to emulate unnecessary biological functions. Software simulations that use von Neumann compatible data types and techniques may more readily transition to parallel memory based and scalable computational approaches with these RBF/RCE, kNN embodiments. Embodiments of multiple performance embodiments are also set forth herein.

BRIEF DESCRIPTION OF THE DRAWINGS

Some embodiments are illustrated by way of example and not as a limitation in the figures of the accompanying drawings, wherein the same components in the various figures bear the same reference numerals.

FIG. 8A is a diagram illustrating an enhanced search and sort technique, according to an embodiment.

DETAILED DESCRIPTION

Figure 1:
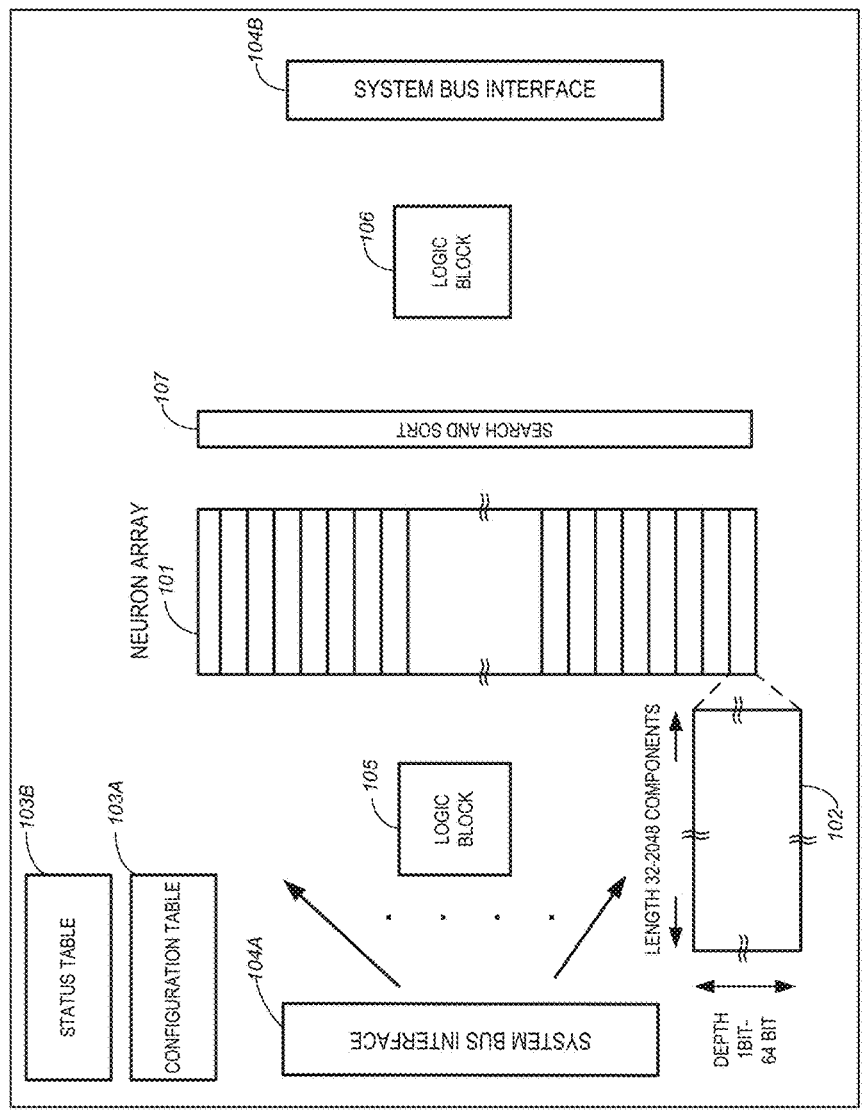
FIG. 1 is a diagram of an integrated circuit, according to an embodiment.

Numerous hardware embodiments are disclosed herein to be included in part in, in all of, or as part of other additional hardware embodiments to make an RBF/RCE and/or kNN non-linear classifier more amenable for heterogeneous inclusion to existing computing environments for broader algorithm support, support for multiple data types and improved performance. For example, when recognizing an object in an image, it may be desirable on one hand to be able to encompass a vector of image data that has 24 bit color field information per pixel (component resolution) with a vector length of 2048 components for high definition images for comparison to other images, while also being useful for Gray scale (8 bits), sound files or other various data files in data mining. Hash functions of 32 bytes (32 components with 8 bits per component such as SHA-32 for example) are another example of supporting multiple data types for generality on a single scalable architecture.

Numerous improvements are made to speed pre- and post-processing of data and results. In prior embodiments, these pre- and post-processing functions are performed by the host computer in a software algorithm. Significant performance improvements are made through the addition of pre-processing hardware, in the form of either dedicated hardware or a programmable controller, which may perform a number of functions on an incoming vector. As an example, this pre-processing hardware may improve the performance of the system by filtering the data to perform feature extraction before comparison to the stored vectors.

Post-processing hardware, in the form of either dedicated hardware or a programmable controller, are included to improve system performance. An example is the Bayesian probabilistic statistical analysis on the results prior to presenting the information to the system. The system interface may be enhanced to allow ease of communication to standard memory interfaces or DMA support logic to local memory for fast transfers to various standard memory types.

An integrated status table may enable faster system performance by providing consolidated information of the chip's status to the operating system. For example dynamic status information of the number of neurons committed to different contexts, and the number of contexts that are on the chip are examples of system performance enhancements for using the chip in a multipurpose environment.

An integrated configuration table may also allow the operating system to configure the various parameters of the device, including but not limited to the algorithm to be used during learning and recognition, the length and depth of the neurons, and the masking mode and mask to apply to incoming vector data. The configuration table may also store factory device configuration information, for example, how many neurons are on the chip, a manufacturer's ID, and device performance information.

Improvements to supported algorithms or additional algorithms may also be included. An example is support for K-Means clustering wherein cluster points are chosen for comparison to a set of data points. One such use of this improvement is that these un-clustered data points are stored in the neuron array with the intent of finding the nearest cluster point of N cluster points being submitted. These N cluster points are submitted to the chip to determine which cluster point the stored data point is closest to. An historical association is kept as each new cluster point presents itself. The neuron then updates the cluster data point that it is associated with the new cluster point if the new cluster point is closer than a previously observed cluster point. Another use of the logic block for post processing in this example application may be to calculate new N-prime cluster points with the sorted data in the neuron array through averaging.

Another algorithm embodiment is integration of a recommendation engine where it is desirable to compare relevant information between two "customers" or clients to determine if one's buying patterns is applicable to another's for recommendation by excluding in the calculations comparisons of fields (components) where there is no common experience (represented as a "0" in the component field).

Support for system performance embodiments may be incorporated in many ways. One such embodiment is previously patented search and sort method U.S. Pat. No. 5,740,326 entitled "Circuit for Searching/Sorting Data in Neural Networks," which is incorporated herein by reference in its entirety, and comparing individual bits from highest order to lowest with all distances participating in a "wired OR" fashion. To enhance this approach for subsequent closest matches, such as a k-Next Neighbor ("k-NN") algorithm where k is greater than one), it is desirable to keep track of when the neuron dropped out of the wired OR comparisons. A modified binary search may be performed as discussed below, allowing a reduced comparison of lower order bits to determine the next closest vector.

To facilitate increased performance and capacity, in one embodiment a separate bus, or "backside bus," may be used wherein a dedicated inter-chip communication bus is used to coordinate the functions of the integrated chips on this bus. One chip may be designated as the master with the remaining as slaves to this chip. Parallel operations and coordination of results happens via this dedicated backside bus that each chip is connected to.

An embodiment may include multi-stage pipelining of intra-chip operations to improve system performance. In prior embodiments, the loading of vectors is serially followed by vector recognition and calculation, which is in turn followed by output of results. An embodiment may perform these operations in parallel; for example, the loading of the next vector set occurs while at the same time the current vector set is undergoing recognition, and further the results from the previous vector set are output to the system.

The embodiment may also pipeline multiple fuzzy or exact match results to the output when more than one neuron fires, similar to finding multiple exact matches in data de-duplication comparing hash function tags. Fuzzy matches are determined via an influence field associated with each neuron that specifies the maximum and/or minimum difference in distance between the input vector and the stored neuron vector allowed. For the neuron to fire, or signal it is a fuzzy match, the distance result needs to be within the influence field of that neuron. These distance or firing neuron results may be read out all at once or sequentially, one after the other, providing greater throughput for the system user.

An embodiment of a chip that includes some or all of the above techniques now will be described more fully hereafter with reference to the accompanying drawings. Indeed, these may be represented in many different forms and should not be construed as limited to the embodiments set forth herein; rather, these embodiments are provided by way of example.

FIG. 1 is a diagram of an integrated circuit, according to an embodiment. The circuit contains a system bus interface 104A, 104B, for inputs and outputs, a neuron array 101 for calculating distances, search and sort hardware 107 for finding closest or exact match, logic 105, 106 for preprocessing and post processing of the input or stored data, a configuration table 103A for configuring the device, and a status table 103B that stores status information for an external CPU such as a host processor. The neuron 102 in one embodiment may handle vectors of any length from 32 to 2048 components, with 1 to 64 bits per component. Interfaces 104A, 104B to the external and support logic broadcast a vector that is of variable length and depth to a compatible neuron array of similar breadth and depth-per-neuron.

The system bus interface for inputs and outputs 104A, 104B, may be the same bidirectional bus or separate buses. Information flows from this bus interface to an optional preprocessor at logic block 105 and then broadcast in parallel to an RBF/RCE-based neuron array 101 for calculating distances between input vectors and learned vectors.

Figure 2:
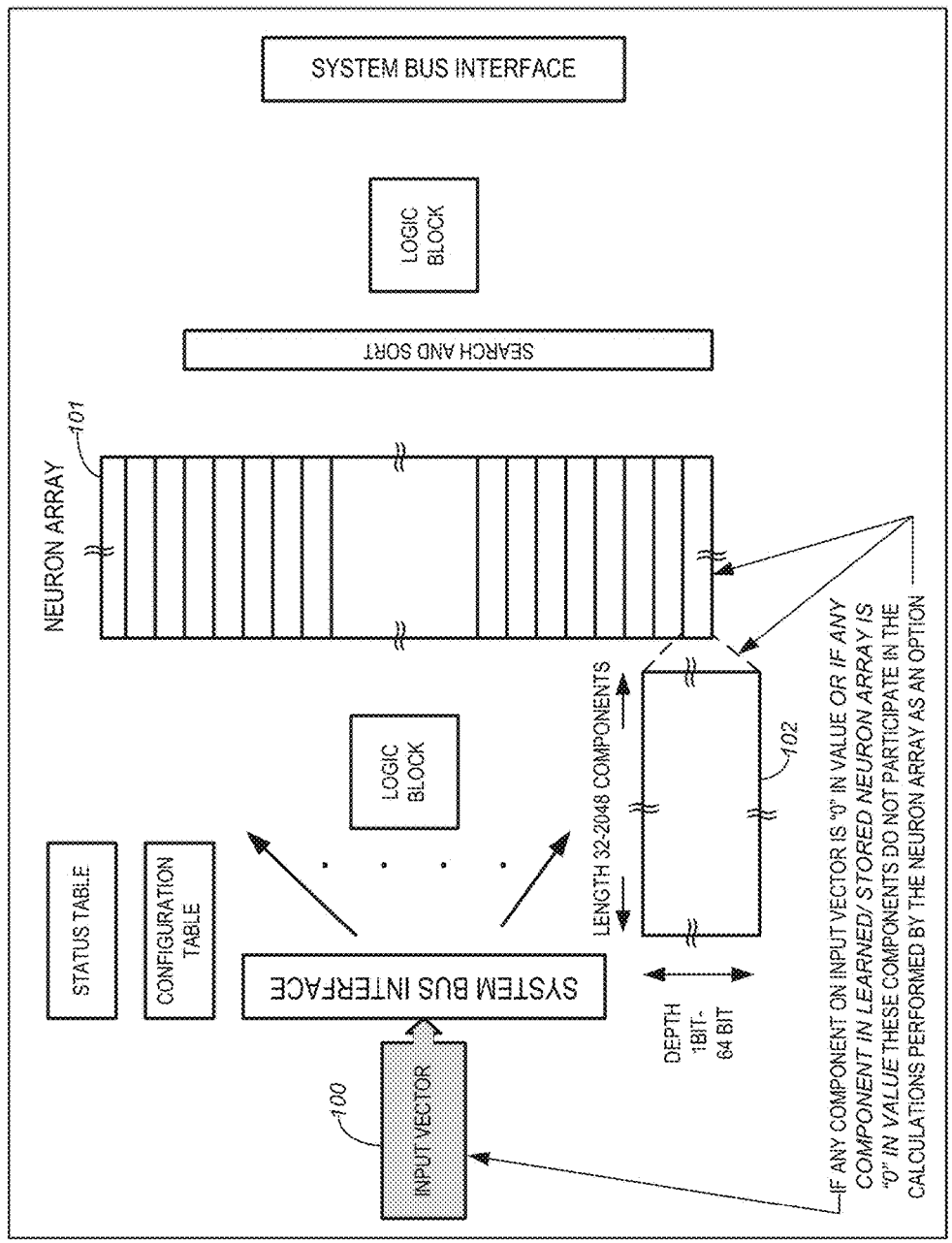
FIG. 2 is a diagram of the integrated circuit of FIG. 1 that provides a feature wherein any of the components in the input vector, stored vectors, or both, have zero (0) value are excluded from the calculation in the neuron array, according to an embodiment.

FIG. 2 is a diagram of the integrated circuit of FIG. 1 that provides a feature wherein any of the components in the input vector 100, stored vectors or both have zero (0) value, according to an embodiment. In one embodiment, this component is not used in calculating the distance between the input and stored vectors. It is desirable in some applications to remove zero value data from consideration, as the zero indicates a null value which if considered would considerably skew the distance calculation results.

Figure 2A:
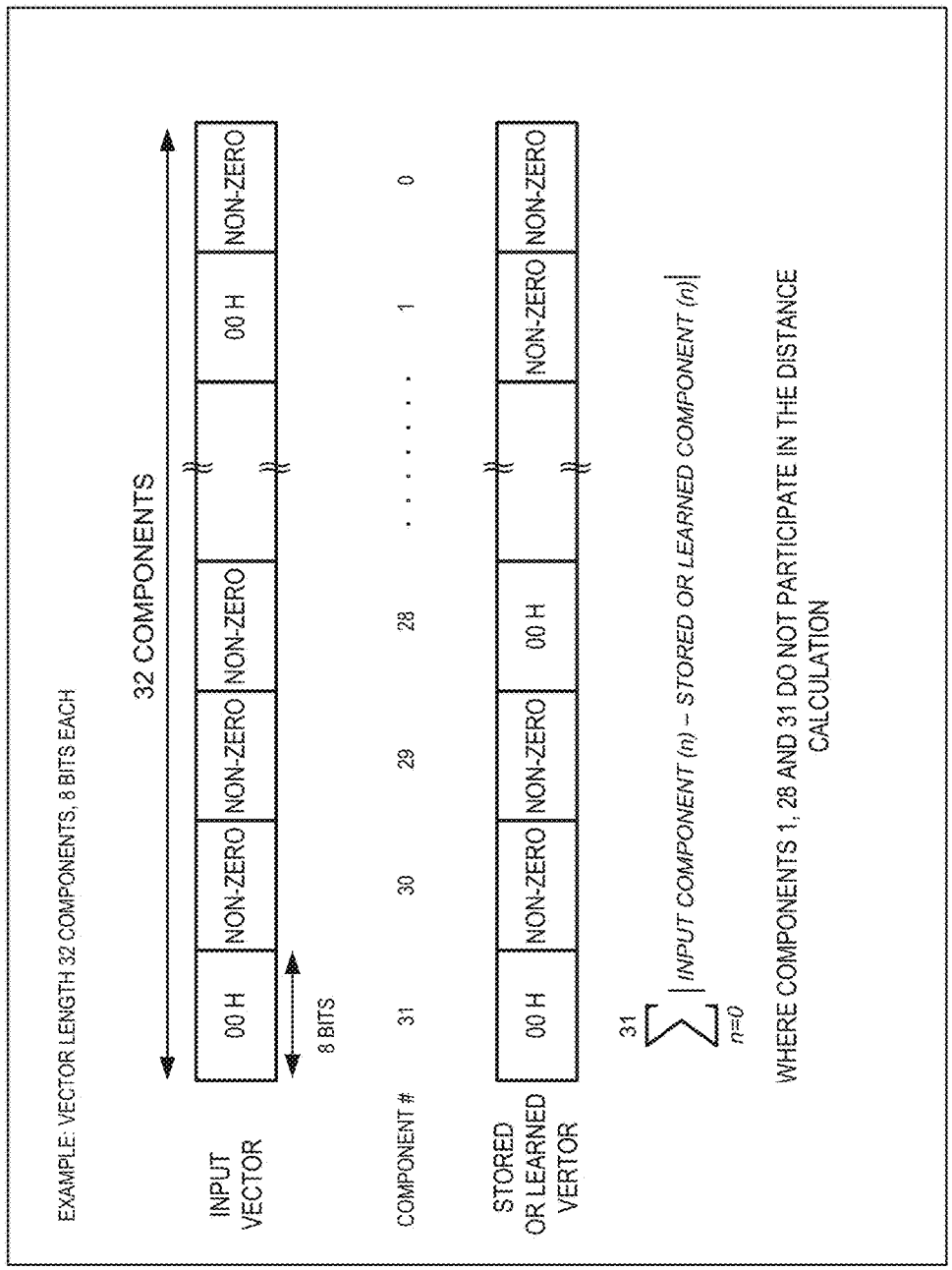
FIG. 2A is a diagram showing an example of excluding components or parts of the components from the distance calculation in FIG. 2, according to an embodiment.

FIG. 2A is a diagram showing an example of excluding components from the distance calculation in FIG. 2, according to an embodiment. In FIG. 2 input vector 100 may be scanned for any 00H component as it comes in on the input and before it is broadcast to the neuron array. Alternatively, neurons of the neuron array 101 may check the input vector for any 00H component after it has been broadcast to the array. Likewise any stored vector (or prototype) in the neuron array 101 may be also scanned for 00H. The scanning may be done using well known comparator hardware logic and may be done serially, or in parallel with circuitry that looks at all bits concurrently. If either the input vector 100, the stored vector in neuron array 101 or both has a 0H ("zero hex") component, it and its counterpart component may be ignored in the distance calculation. The width of the component may vary from 1 binary bit to 64 binary bits. Any component where all of the component bits are zero will be excluded from the calculation, as will the corresponding input or stored component. The distance calculation will be the sum of all components distances, minus the components where an all zeroes condition was found. In the example shown, the distance calculation is the sum of components zero through 31, with components one, 28, and 31 excluded from the calculation.

Figure 3:
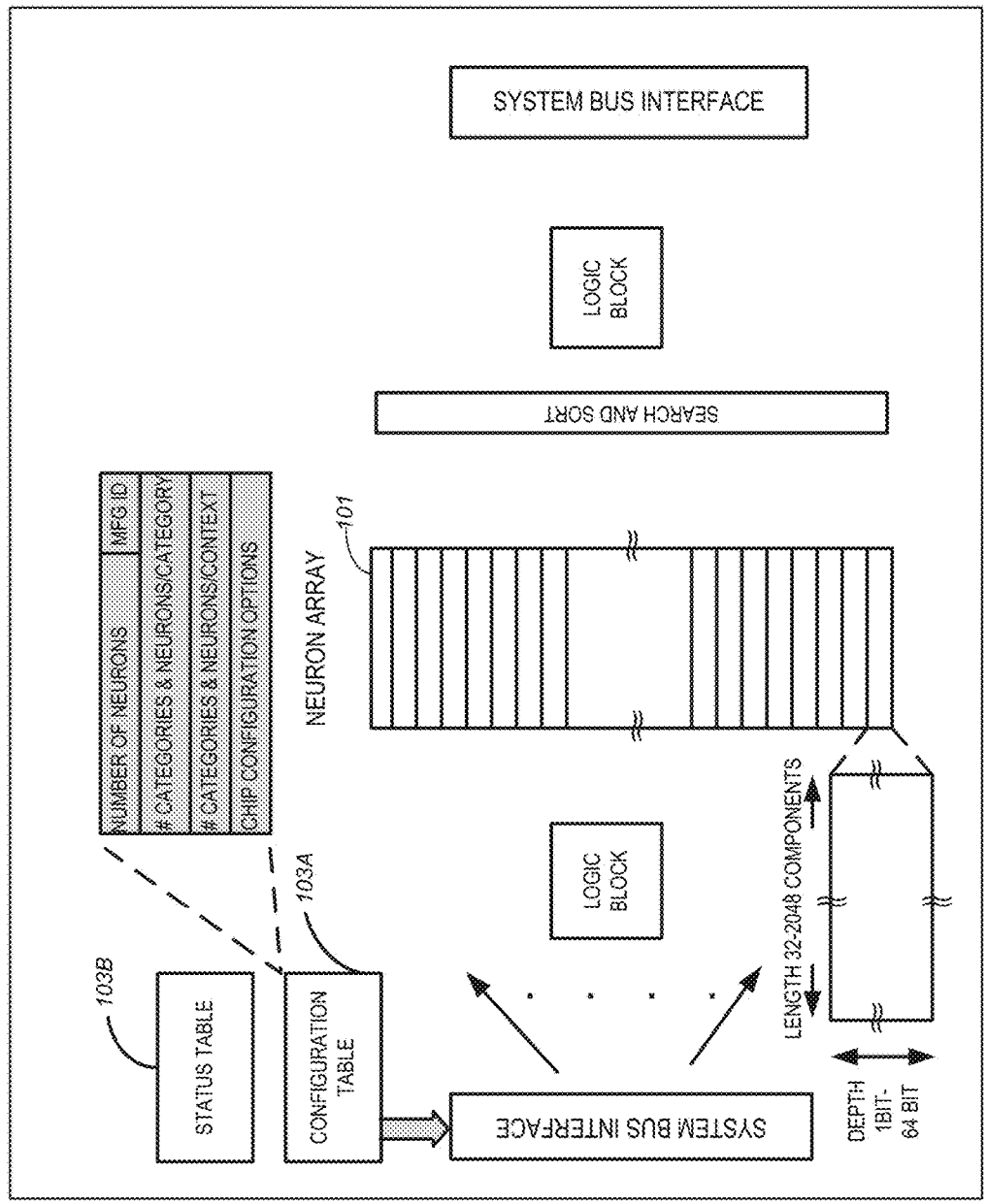
FIG. 3 is a diagram of the integrated circuit of FIG. 1 showing an externally accessible configuration table that may be included on hardware based nonlinear classifier that gives fixed (read only) information about the chip configuration and capabilities. Also shown is an externally accessible status register that provides variable (rewritten in real time) information about the chip status, according to an embodiment.

FIG. 3 is a diagram of the integrated circuit of FIG. 1 showing additional detail of an externally accessible configuration table 103A that may be included on a hardware based nonlinear classifier that gives fixed (read only) information. This configuration table may be RAM, ROM and/or flash based. If it is RAM based, the fixed information may be updated at initialization time from an external non-volatile source. Status table 103B may be included on a hardware-based nonlinear classifier that provides variable (rewritten real time) information about the chip status, according to an embodiment. Real time updates as to the status of the neurons, such as number of categories, neurons per category, number of contexts and neurons per context, for example, are provided to the host through the status table.

Figure 4:
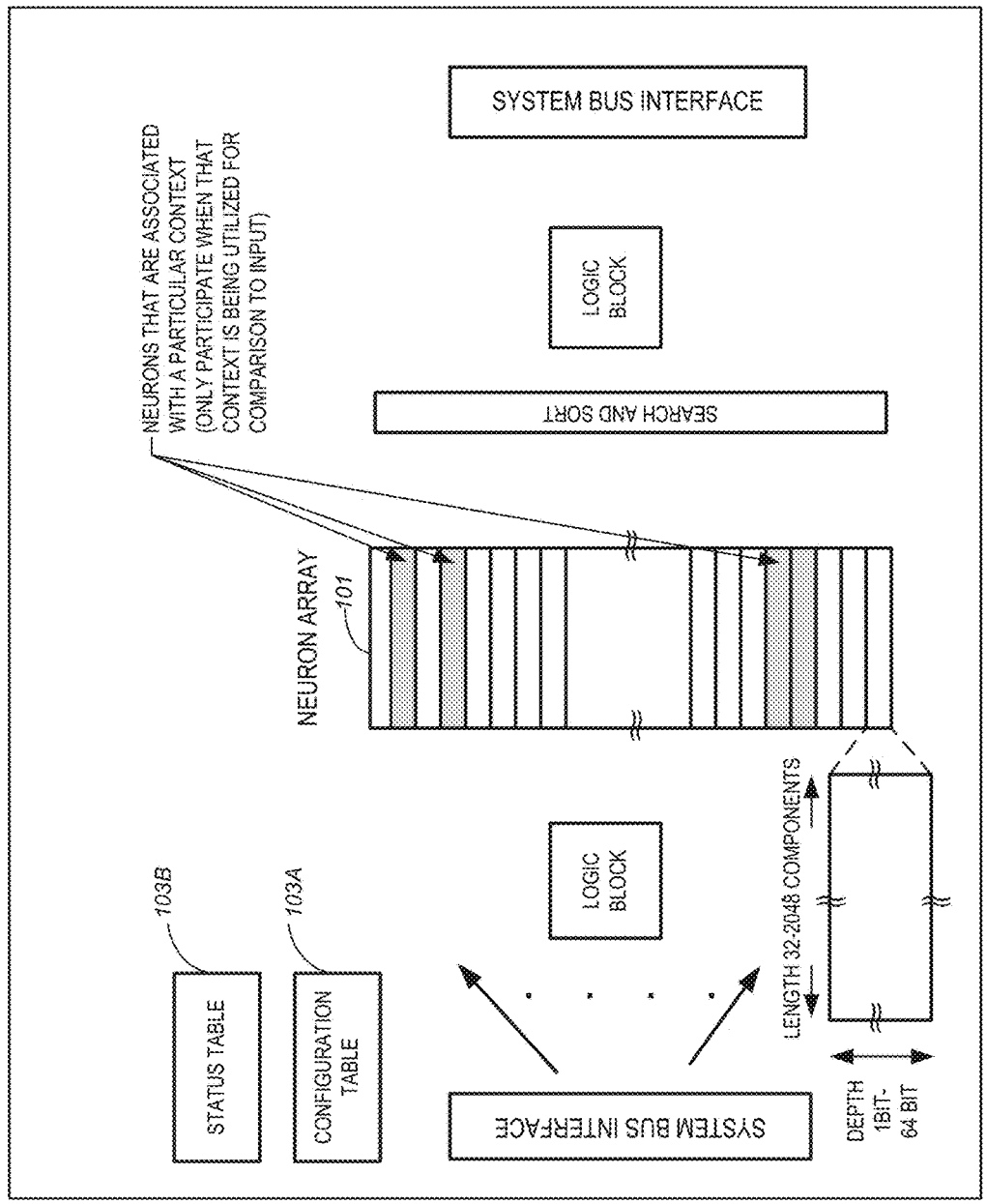
FIG. 4 is a diagram of the integrated circuit of FIG. 1 depicting neurons, which may be contiguous or non-contiguous, that may be associated with a particular context and subset categories that may be able to be cleared and reused as a partial clearing of the chip, according to an embodiment.

FIG. 4 is a diagram of the integrated circuit of FIG. 1 depicting neurons in neuron array 101, contiguous or non-contiguous, that may be associated with a particular context. It may be desired that the neurons consumed by a context be able to be cleared and reused. The neurons comprising a context may reside within one chip or be distributed across multiple chips in an array of chips on a board. That is, the neurons to be cleared may be on one or multiple chips. This operation may be done in parallel or serially. When completed, these neurons may then be available for storing vectors of a different context which may or may not require all the neurons that were cleared. Multiple contexts may also be requested for clearing, and handled in sequence or concurrently.

Figure 5:
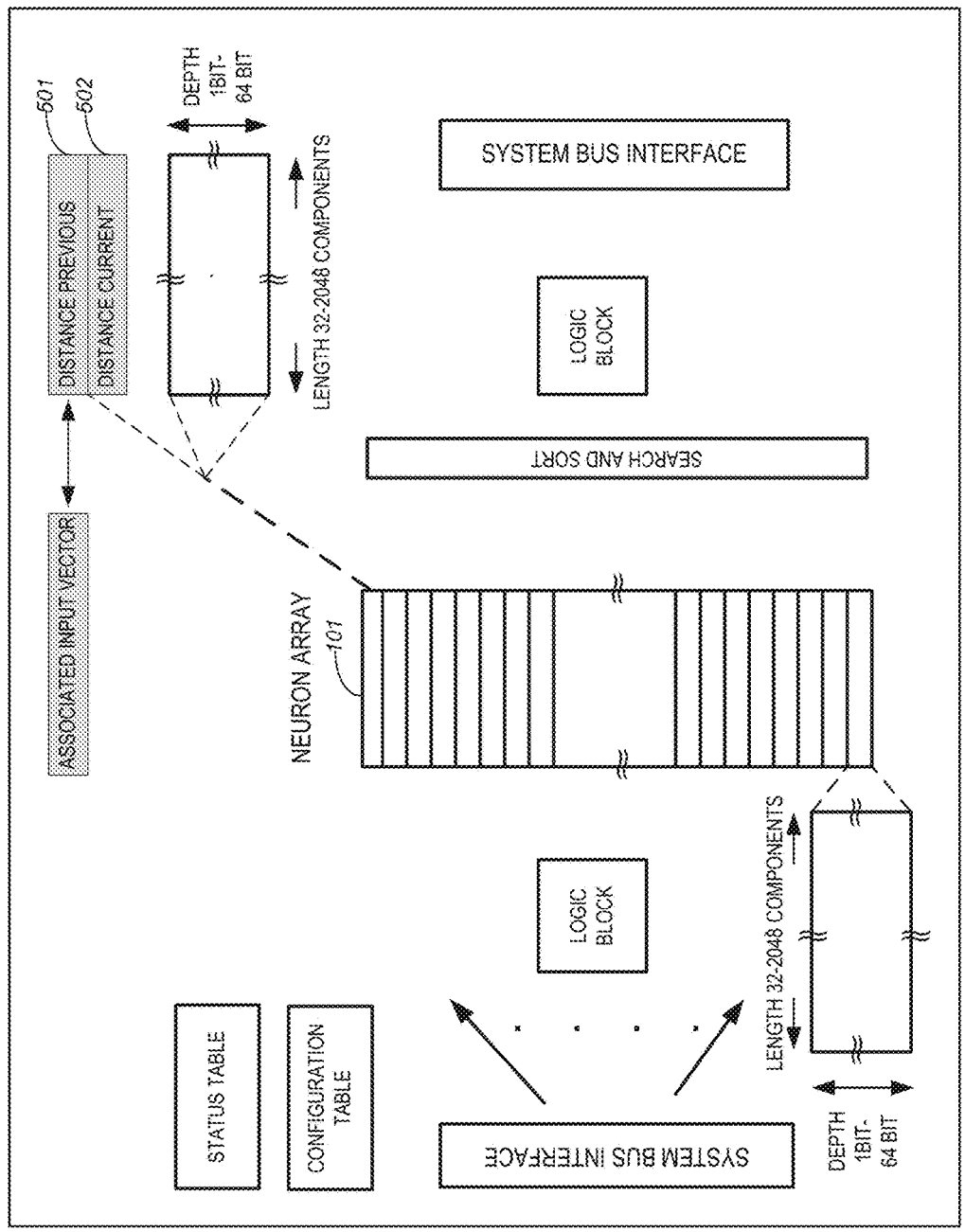
FIG. 5 is a diagram of the integrated circuit of FIG. 1 illustrating individual neurons comprising a set of two registers that stores the distance results, according to an embodiment.

FIG. 5 is a diagram of the integrated circuit of FIG. 1 illustrating individual neurons comprising a set of two registers 501, 502, that store distance results, according to an embodiment. One may be used for storing the current results from the distance calculations. The distance between a learned vector and a new observed vector is often performed using a form of Euclidian or Manhattan distance calculation and results aggregation. One example distance calculation is the Manhattan L1 norm distance, also known as the "taxi cab" distance. In this calculation, the value of each component in the incoming vector is subtracted from the corresponding stored, or learned, vector in the neuron. The absolute values of these calculations are aggregated to form a sum of all component distances. This resulting value, which provides an effective "distance" of the incoming vector from the stored vector, is stored in register 501 along with a vector identification value that identifies the results as belonging to this particular vector. The second register may be kept for each neuron of variable length and depth, and may store the distance of the previous closest result and an identifier for the vector that created the previous closest results. This closest vector may represent a cluster point. Through the keeping of the previous closest results and vector identifier, new cluster points may be presented and a determination made as to whether this new cluster point is closer than previous points, in which case the register will be updated with the new distance and vector identifier. If the new cluster point is found not to be closer than previous cluster points, the register may be left unchanged.

Figure 6:
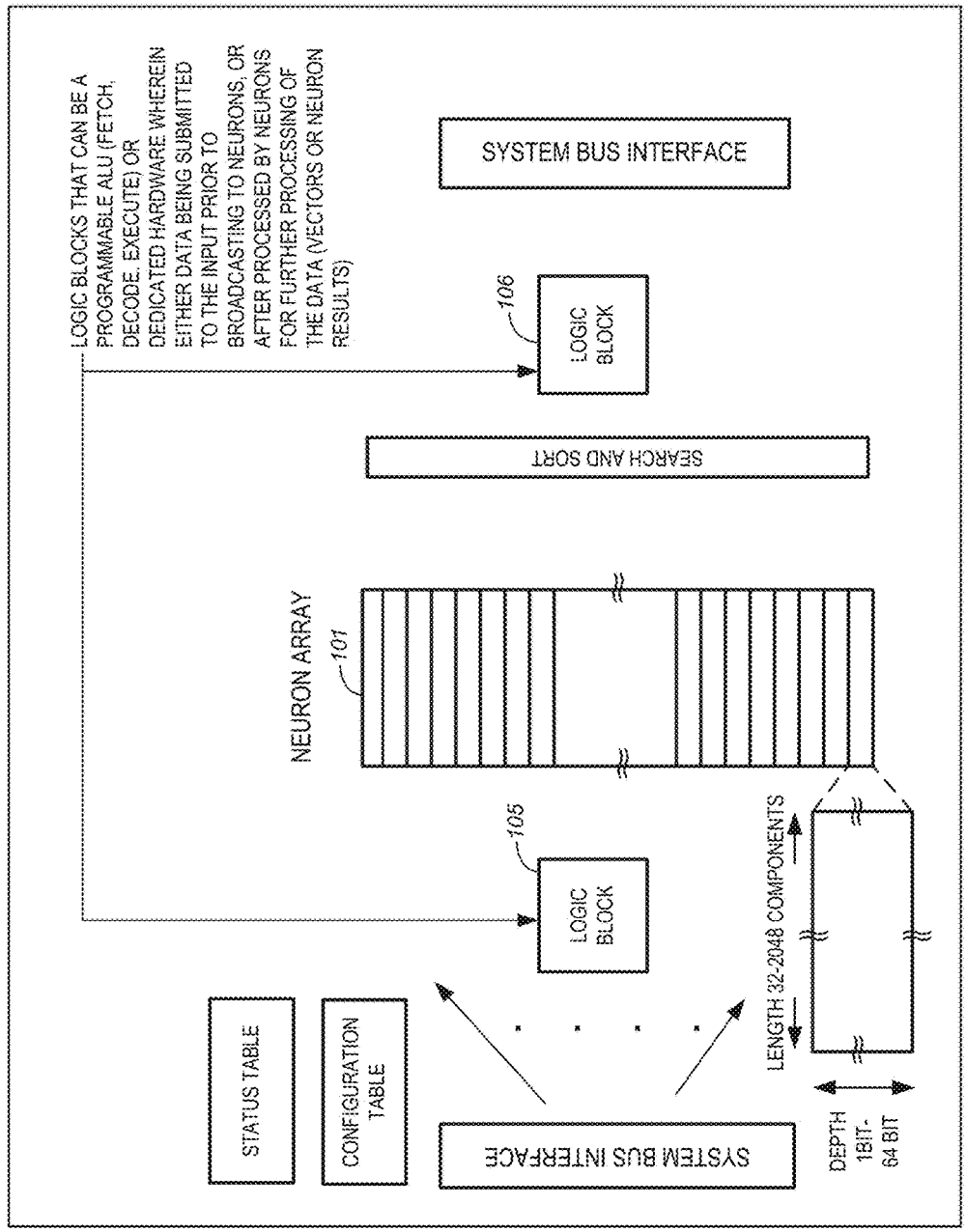
FIG. 6 is a diagram of the integrated circuit of FIG. 1 illustrating preprocessing and/or post processing logic blocks either on the input vector prior to being submitted to the neuron array for calculations or storage or output results after the neuron array calculations or retrieval, according to an embodiment.

FIG. 6 is a diagram of the integrated circuit of FIG. 1 illustrating preprocessing and/or post processing in logic blocks 105, 106 either on the input vector prior to being broadcast to the neuron array 101 for calculations, or prior to the output for post processing of the neuron array results. The processing on the input vector could be used to pre-filter the data, do feature extraction or format the data. The processing on the neuron output results may be for the purpose of implementing a Bayesian statistical classifier in conjunction with the RBF/RCE or kNN operation, or PRCE—probabilistic RCE analysis—as examples.

Figure 7:
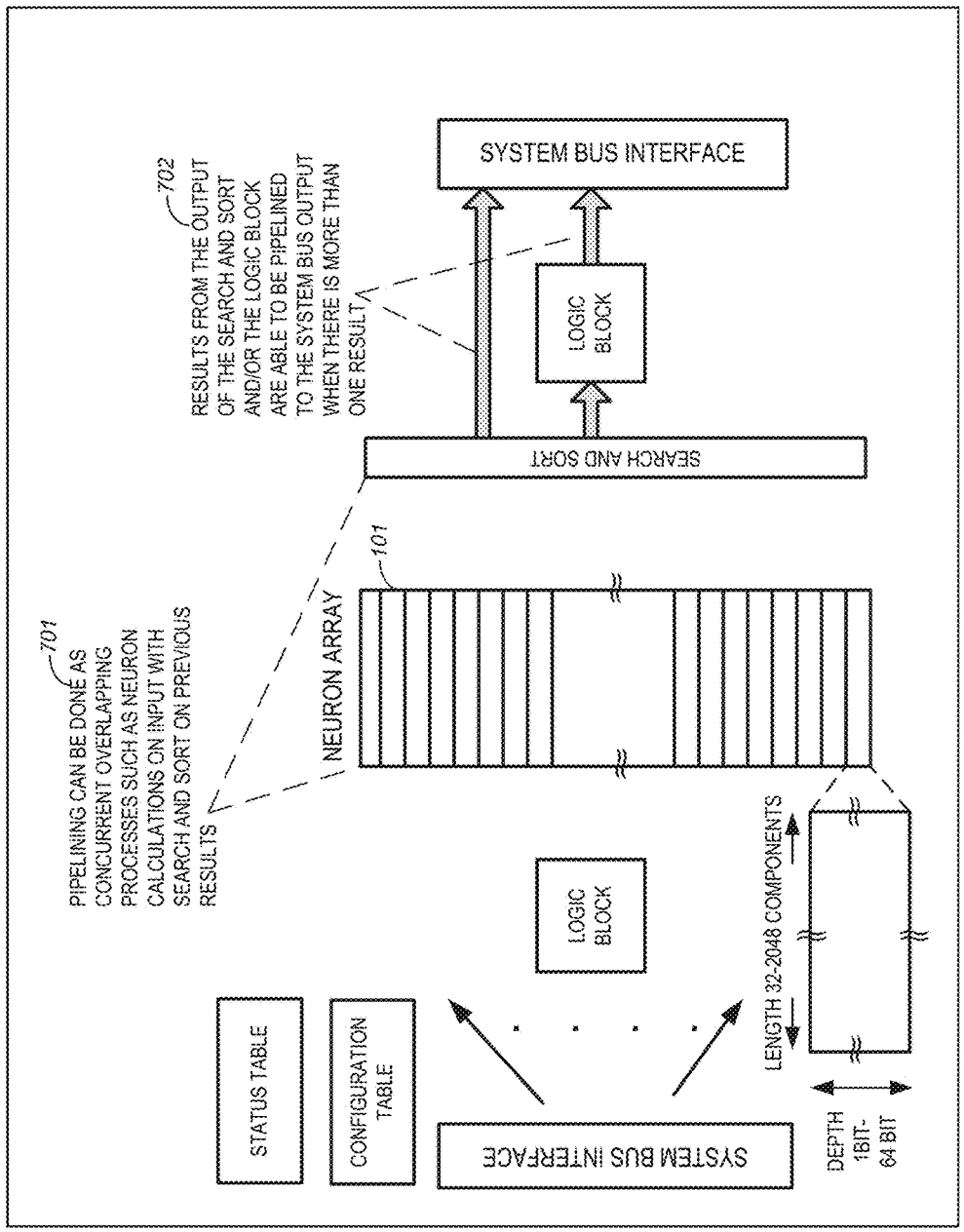
FIG. 7 is a diagram of the integrated circuit of FIG. 1 illustrating the pipelining of results to the output when multiple matches or neuron results may be read out from one operation, according to an embodiment.

FIG. 7 is a diagram of the integrated circuit of FIG. 1 illustrating pipelining of results to the output. Pipelining of the results allows concurrent analysis of the next vector to begin while the system collects the results from the previous vector analysis. Further, multiple matches or neuron results may need to be read out from one operation. Pipelining may also be done on the chip where overlap of operations may be done, such as broadcasting a new vector while the closest match of a current vector may be being determined, and further while the results of a previous vector calculation may be being output to the system.

Figure 8:
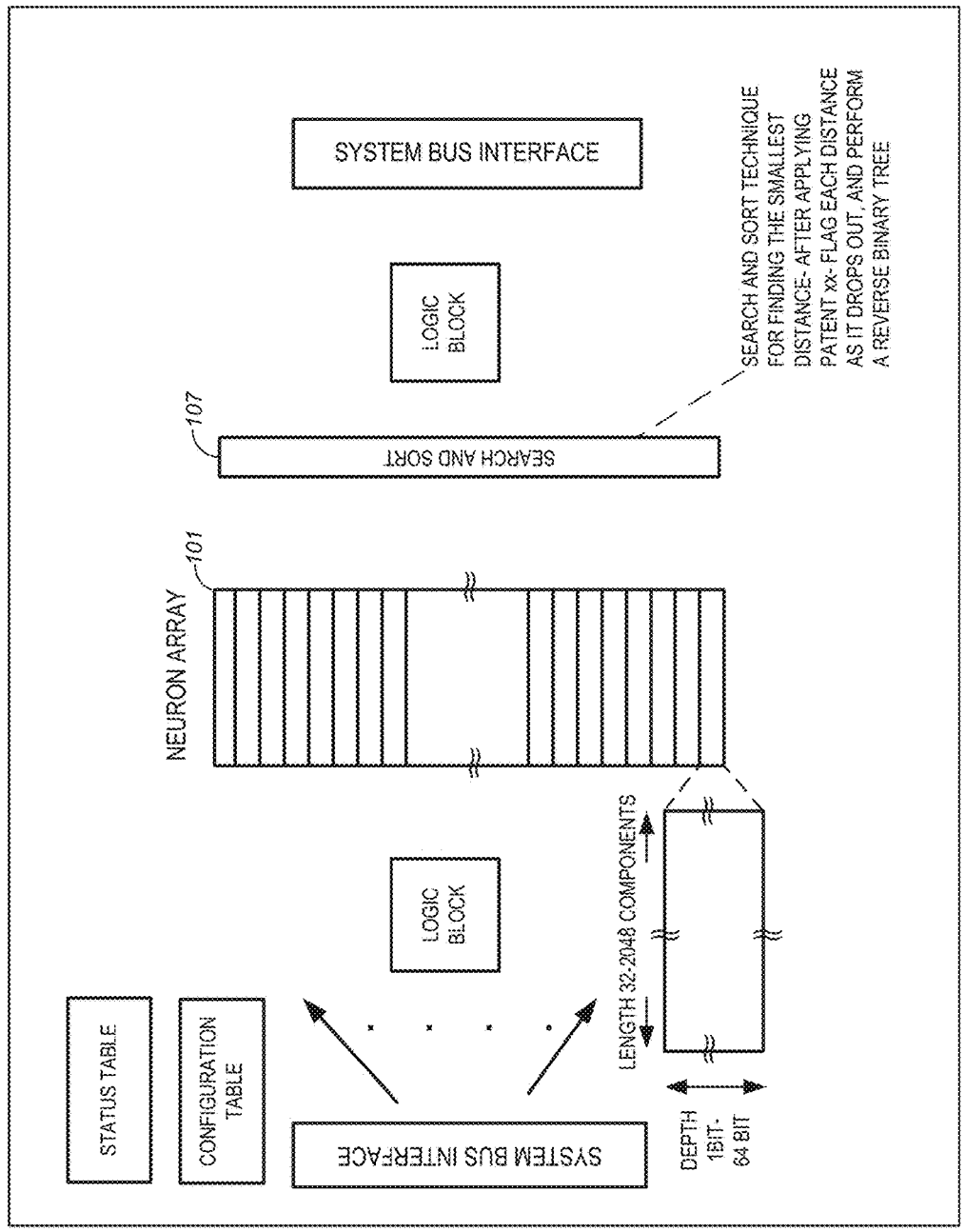
FIG. 8 is a diagram of the integrated circuit of FIG. 1 illustrating search and sort logic using the neuron array distance calculations, according to an embodiment.

FIG. 8 is a diagram of the integrated circuit of FIG. 1 illustrating search and sort logic 107 using the neuron array distance calculations, according to an embodiment. After the neurons have completed the distance calculations, it may be necessary to locate the neuron with the smallest (closest) distance. The search and sort logic performs a binary search algorithm to find the smallest distance. Once found, the neuron with the smallest distance is removed from consideration, and the binary search is repeated to find the neuron with the next smallest distance. This search algorithm is described in detail in the above U.S. Pat. No. 5,740,326.

FIG. 8A is a diagram illustrating an enhanced search and sort technique, according to an embodiment. In the referenced search algorithm, the search for the lowest distance value is performed using a binary search method that begins its search with the Most Significant Bit (MSB), and then proceeds to each next significant bit. As individual bits are presented to the neurons, those with a "1" (High or H) in the specified bit remove themselves from consideration, while those with a "0" (Low or L) remain in contention for the lowest value. All neuron distances are compared in parallel using this binary search algorithm.

In an improvement upon the referenced technique, in the first step of the binary search if there are neurons that have a "1" in the MSB of their distance result and at least one neuron has a "0" in its MSB, then a flag is set representing that this is the bit location from which neurons removed themselves from consideration. The binary search then continues to the next significant bit, repeating the aforementioned process, and again setting a flag when neurons remove themselves from consideration. Thus after the first lowest distance is found, the next larger distance may then be found by "backtracking" the binary search to the last known digit that presented a "0" result. A binary search between this "backtracked" bit position and the smallest value bit position is then performed. By using this modified binary search, the time to locate each subsequent lowest value is effectively reduced by one half on average.

Figure 9:
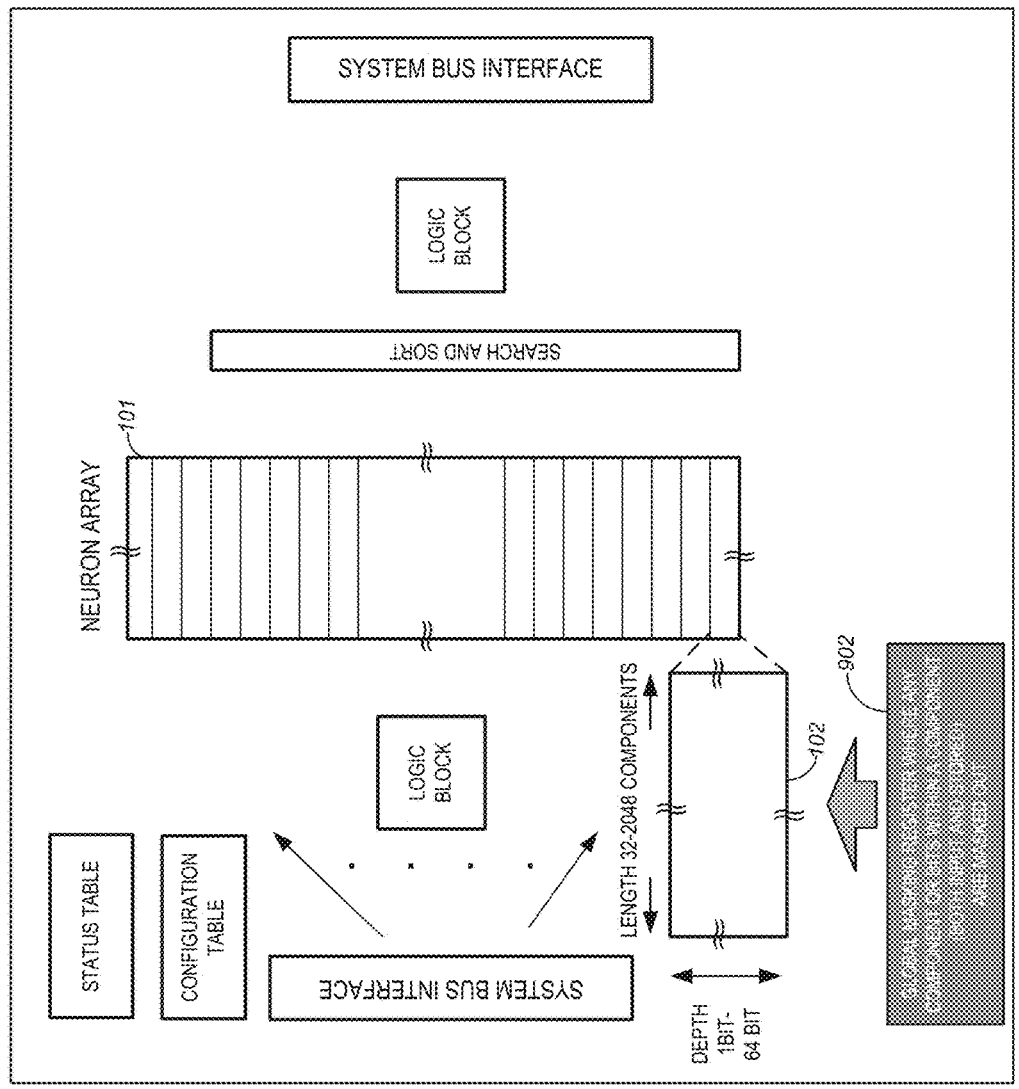
FIG. 9 is a diagram of the integrated circuit of FIG. 1 depicting a global masking register that may be applied to components, sets of components and/or bits of components for exclusion from calculations, according to an embodiment.

FIG. 9 is a diagram of the integrated circuit of FIG. 1 depicting a global masking register 902 that may be applied to components or sets of components for exclusion from calculations, according to an embodiment. This may also include masking of individual bits within a component by making the bits and/or the components a "don't care" field in the neuron operations.

Figure 10:
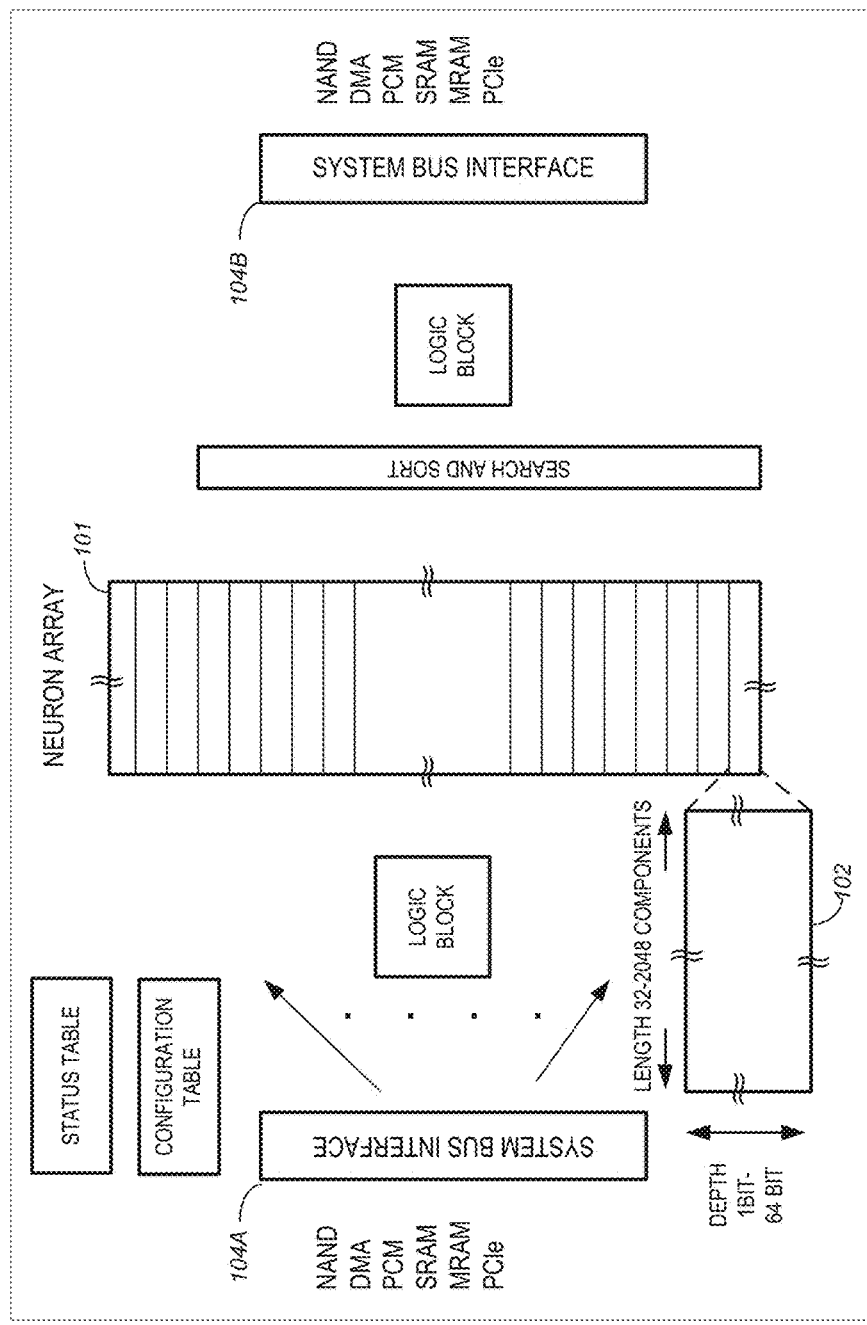
FIG. 10 is a diagram of the integrated circuit of FIG. 1 depicting the integrated circuit having a NAND, DMA, PCIe, DRAM, Phase Change Memory (PCM) MRAM or SRAM compatible interface, according to an embodiment.

FIG. 10 is a diagram of the integrated circuit of FIG. 1 depicting the integrated circuits 104A, 104B having a NAND, DMA, PCIe, DRAM, Phase Change Memory (PCM) MRAM or SRAM compatible interface, according to an embodiment. These standard interfaces may be specified by committees such as ONFi (for non-volatile memory) and/or Jedec memory standardization committees. A combination of the use of a neuron memory heterogeneously in a von Neumann processing environment under the same buses as standard memory may be used to accomplish simple integration into existing systems. System design-in time may be greatly reduced through the use of industry-standard memory interfaces. The input/output interfaces 104A, 104B may be on one set of pins or two separate sets of pins. Neuron memory, which is an associative memory by nature, does not naturally fit into von-Neumann memory interfaces. The additional memory interface logic will help ease usage of the neuron memory in existing system design and memory interface controllers. By combining the attributes of an associative memory with the physical direct addressability of a von Neumann memory, which can be random, block or sequentially accessible, a new capability is provided that provides high-speed memory access as well as content associative access to the neuron memories.

Figure 11:
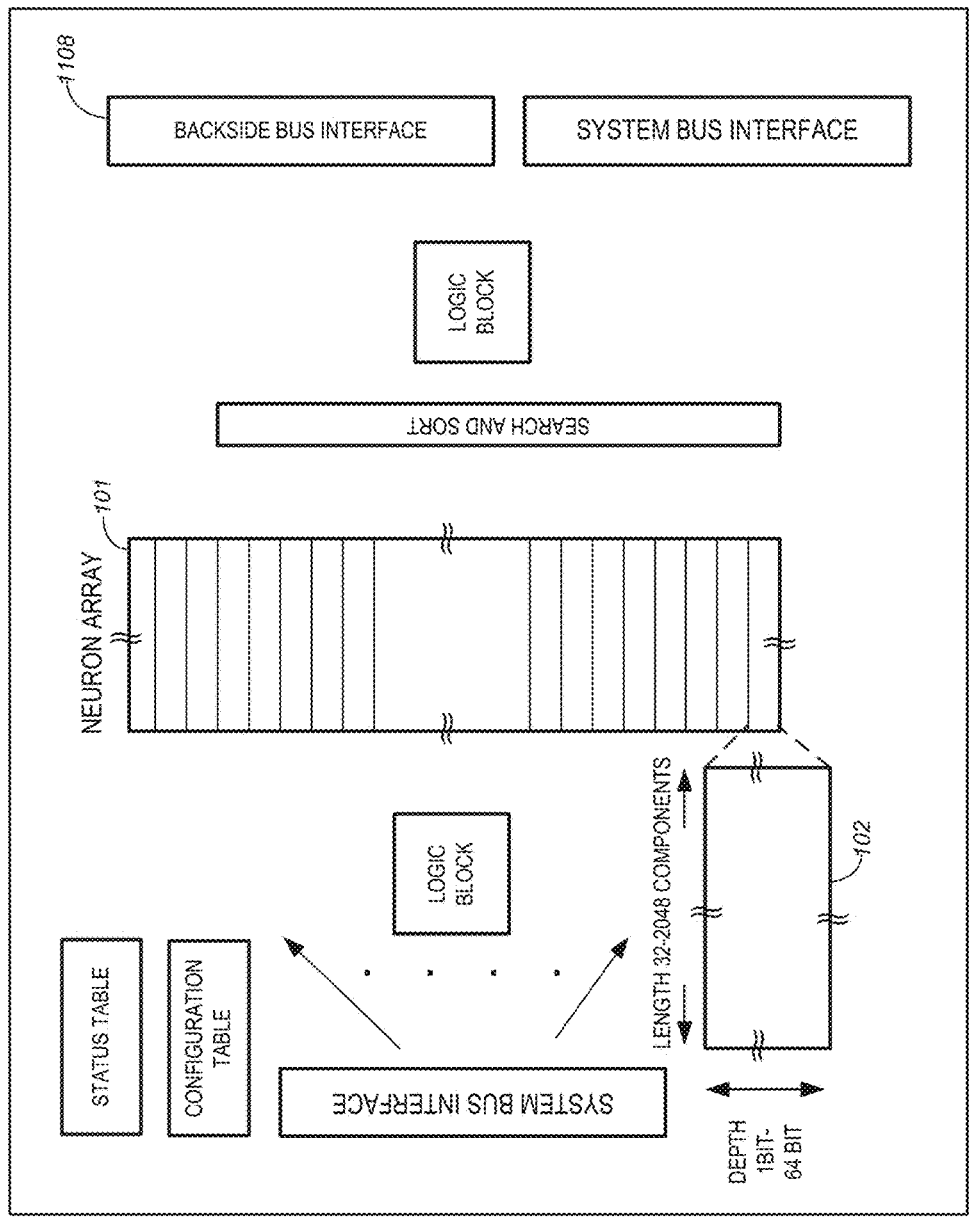
FIGS. 11 and 11A are diagrams illustrating a backside bus which may be used to connect chips covered by this disclosure together for inter-chip communications, according to an embodiment.
Figure 11A:
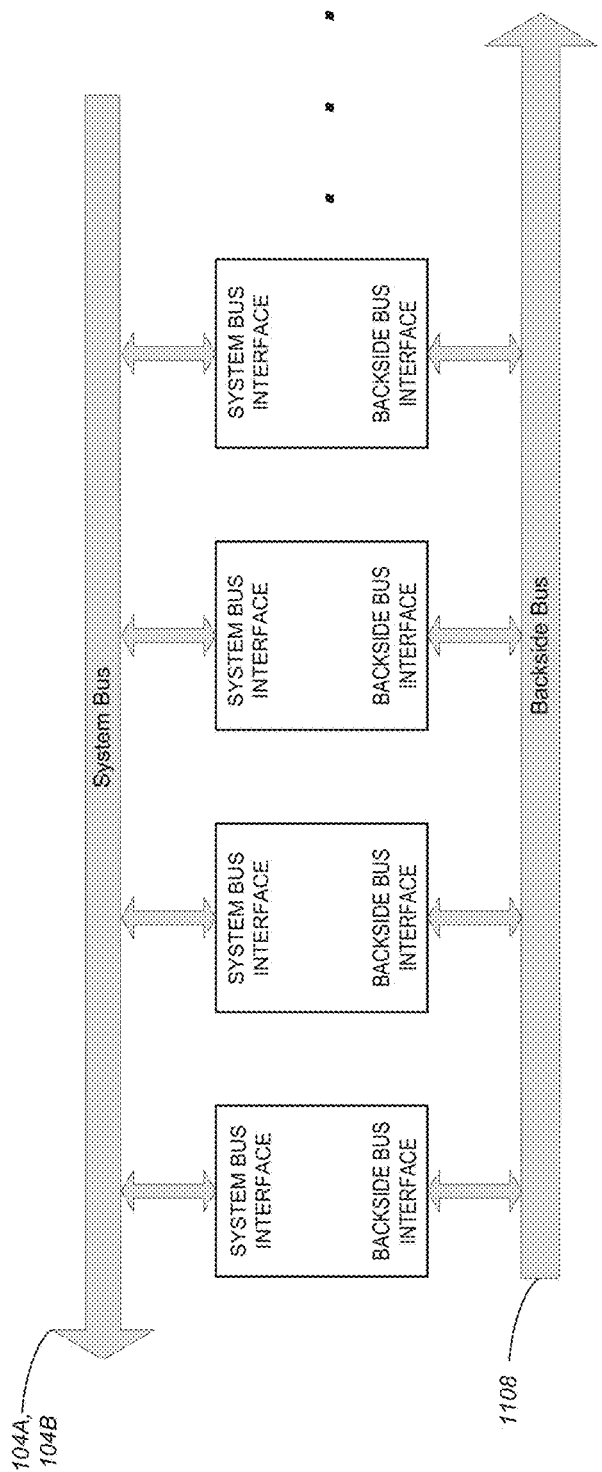

FIGS. 11 and 11A are diagrams illustrating a backside bus which may be used to connect chips covered by this disclosure together for inter-chip communications, according to an embodiment. FIG. 11 illustrates a backside bus 1108 which may be used to connect chips such as those discussed above together for intercommunications between chips. This extra bus interface may be its own proprietary bus or a repurposed input/output bus. One purpose of this bus may be to provide a means for communication between chips to support intermediate calculations, coordination of neuron operations, and analysis of results. It may be serial or parallel. FIG. 11A illustrates multiple chips connected to system bus 104A, 104B for communication to a host controller. The chips are also connected by the aforementioned backside bus 1108 for inter-chip communication that may be independent from the communication occurring on the system bus.

Improved Classifier Architecture

The classifier architecture is comprised of a large number of calculating engines which operate synchronously in parallel. The engines all calculate a comparison between two vectors; a vector stored locally with the calculating engine, and an incoming vector. A "vector" is simply an array of values representing a single document, or image, or database entry, etc. The classifier may, under algorithmic control, choose to add un-recognized vectors to its collection of learned vectors.

Vector comparisons are the foundation of a number of data mining algorithms. In a nearest neighbor search, an input vector is compared to a stored collection of vectors to find the most similar matching items. In clustering, many vector comparisons are made iteratively in order to discover natural groupings in a dataset. These algorithms can then be applied to a variety of data mining applications.

Large Scale Vector Comparisons

In this embodiment, vectors are "compared" using distance calculations—the distance between two vectors is taken as a measure of their similarity. However, any mathematical calculation can be used in the comparison operation.

Each neuron contains a memory array to store one vector and a math unit that compares the stored memory to an incoming pattern. Once the neuron memory arrays are all loaded with vectors, an input vector can be broadcast to all of the neurons in parallel, and the neurons will each calculate the distance between their stored vector and the input vector.

While a significant number of neurons may be integrated into a single chip, requirements of the application may be best met when a large number of the chips are connected in parallel, thus many chips may be instantiated in a single system. Improvements in managing participation of neurons, collection of calculation results, and minimizing host input signal requirements through signal aggregation are described.

Distance Metrics

The neurons implement two distance metrics: the L1 distance (also known as the "Manhattan" distance) and the Hamming distance. The L1 distance is useful for comparing vectors containing continuous-valued data and is calculated as the sum of the absolute differences between each of the components:

$$dist_{L1}(a, b) = \sum_{i=1}^{n} |a_i - b_i|$$

The Hamming distance is useful for comparing symbolic data. Most notably, when combined with the MinHash algorithm, it can be used as an approximation to the Jaccard Similarity for comparing sets. The Hamming distance is simply the count of the number of components which are not identical:

$$dist_H(a, b) = \sum_{i=1}^{n} [a_i \neq b_i]$$

Results Filtering

Often, when comparing vectors, we are not interested in all of the resulting distance values, but rather in finding the most similar elements in the data set. This embodiment has additional features for filtering the results of the distance calculations in order to identify just the vectors of interest.

First, the embodiment implements a patented technique which allows for linear-time sorting of the distances. The calculated distances are read out serially from the chip, in order of increasing distance.

Second, the Neuron Selective Participation (NSP) and Virtual CAM (VCAM) features allow the user to dictate criteria for which vectors are of interest. For example, it is possible to identify just the neurons whose calculated distance values are below a set threshold (each neuron can have a unique threshold value).

Results Aggregation

In a large system containing many chips which in turn contain many neurons, locating the neuron with the most similar vector can be require significant time. While the patented linear time sorting method provides the most similar very quickly in a single chip, aggregating these results across multiple chips requires further innovation. In this embodiment a novel results aggregation mechanism is described which allows a group of like chips to self-aggregate their results.

Chip Architecture

Figure 12:
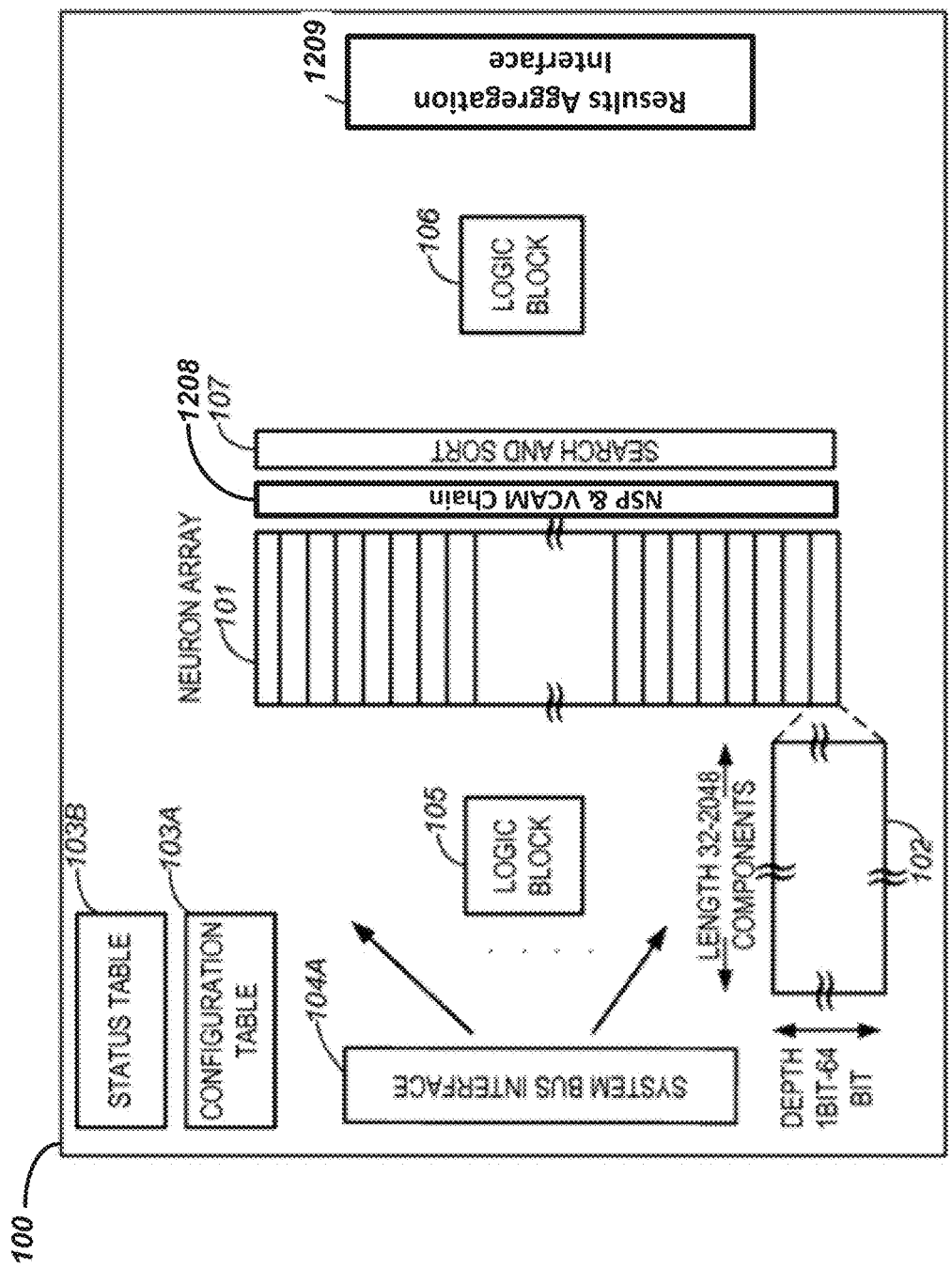
FIG. 12 is a diagram of an integrated circuit, according to an embodiment.

FIG. 12 shows a simplified block diagram of an embodiment of a neural network chip. The neural network chip 100 contains a system bus interface 104A, for inputs and outputs, logic 105 for accepting commands from a host and controlling operations of the neuron array, a neuron array 101 for calculating distances, neuron selective participation (NSP) and virtual content addressable memory (VCAM) daisy chain 1208 for managing which neurons participate in operations and for determining the unique identifier of neurons meeting specific criteria, neuron results search and sort hardware 107 for finding closest or exact match, logic 106 for preprocessing and post processing of the input or stored data, a configuration table 103A for configuring the device, a results aggregation interface 1209 that collects distance results from other chips in the system or aggregates chip signals for a reduction in host pin count requirements, a status table 103B that stores status information for an external CPU such as a host processor. The neuron 102 in one embodiment may handle vectors of any length from 1 to 2048 components, with 1 to 64 bits per component. Interface 104A to the external and support logic broadcast a vector that is of variable length and depth to a compatible neuron array of similar breadth and depth-per-neuron.

Neuron Architecture

Figure 13:
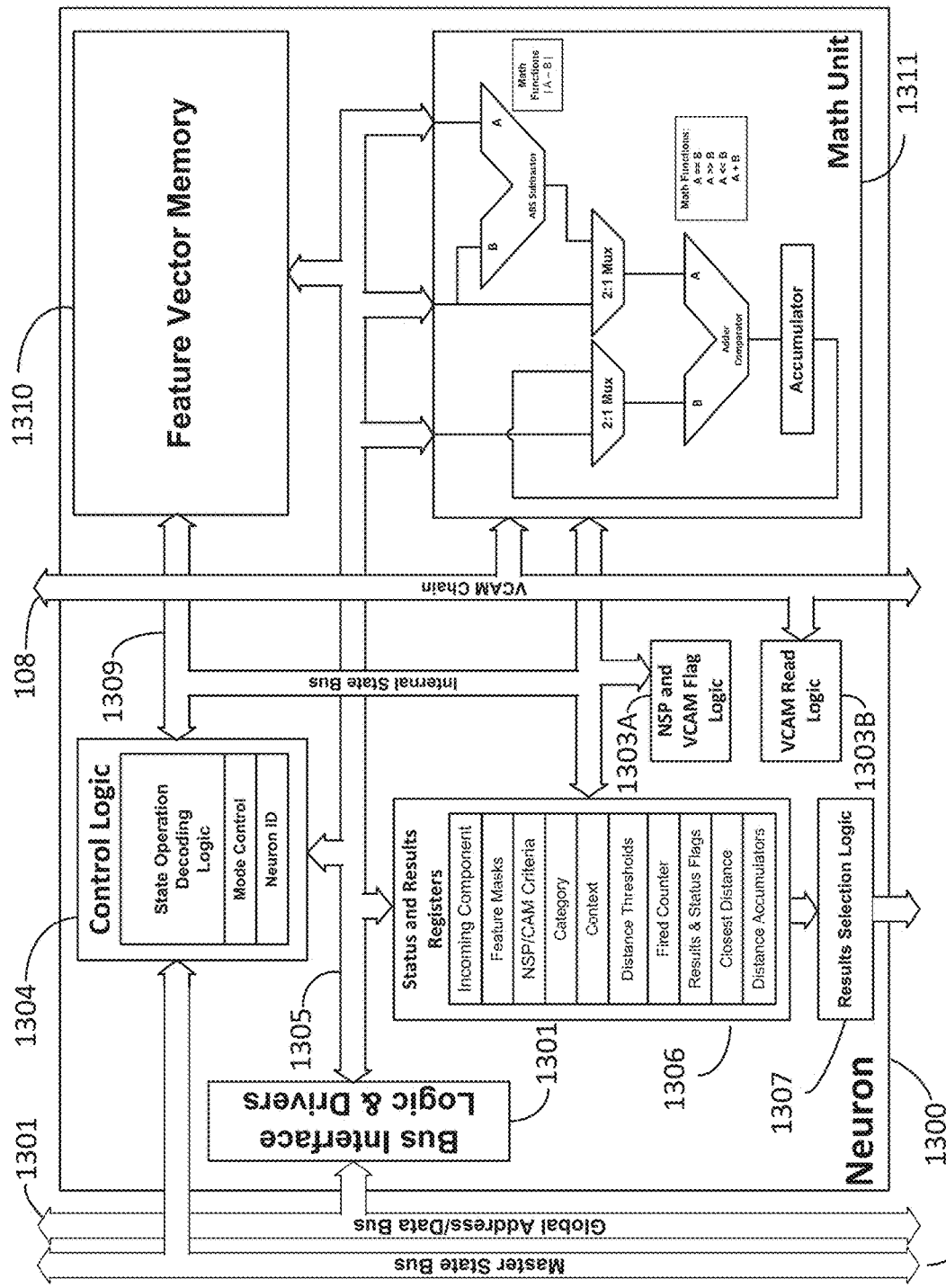
FIG. 13 is a diagram of one of a plurality of neurons contained in the integrated circuit in FIG. 12, according to an embodiment.

An embodiment of individual neurons of Neuron Array 101 is diagrammed in FIG. 13. Each Neuron 1300 contains a Feature Vector Memory 1310 connected to a Math Unit 1311. The operations of the Neuron 1300 are controlled globally by Logic Block 105 via the Master State Bus 1302 which is in turn connected to Control Logic 1304. The Control Logic 1304 block decodes the Master State Bus 1302 and generates control signals on the Internal Status Bus 1309. The Internal State Bus 1309 carries the control signals to the Feature Vector Memory 1310, Math Unit 1311, and Status and Results Registers 1306. The Global Address and Data Bus 1301 is used by either the host computer, through system interface 104A and logic block 105, or independently by logic block 105 to select specific memory locations in the Feature Vector Memory 1310 or Results and Status Registers 1306. Each neuron is connected to the Global Address and Data Bus 1301 through Bus Interface Logic and Drivers 1303; this block determines the operation being performed, either a read or write, and controls the drivers to either receive data from the Global Bus 1301, or drive data from the neuron to the Global Bus 1301. Lastly the selective participation of the neuron in various operations including the Virtual CAM sequential read operations, are controlled by the NSP and VCAM Registers and Logic 1303.

Neuron Control Logic

The Control Logic 1304 block controls operations internally to the neuron, dependent upon the operations specified by the host or by the Logic Block 104. During host read and write of FVM 1310 or Status and Results Registers 1306, the Logic Block 104 simply connects the host System Bus Interface 104A to the Global Address and Data bus 1301, and the host controls the signals present on this bus. During calculations and other neuron operations, the Logic Block 104 controls both the Global Address and Data bus 1301 and the Master State Bus 1302. The neuron Control Logic 1304 block uses signals present on the Master State Bus 1302 to determine the operation to be performed. All neurons in the Neuron Array 101 that have been enabled by operations that have set their NSP and VCAM flags participate in these operations.

ponents stored in the FVM 1310 with the components of the incoming vector, and accumulating the results in the Distance Accumulation Register contained in the Status and Results Registers 1306 block. Math Unit 1311 is also used to perform a number of comparison operations, such as greater than, less than, equal to, etc between the contents of a register from the Status and Results Register block 1306 and either a value presented to the neurons on the Global Address and Data Bus 1303, or another register in the Status and Results Register block 1306. This comparison circuitry is shared with the NSP and VCAM Registers and Logic 1303 block, and is used to set the NSP and VCAM flags in this block.

Neuron Status and Results Registers

The Status and Results Register 1306 contains a number of registers that are used to store configuration information for the neuron, such as the values for Context and Category, and also stores results from neuron operations, such as Distance Thresholds and Event Counters. These registers may be written as a result by the neuron control logic 1034 as a result of neuron operations. These registers may also be written to directly from the host through the system interface 100, and may also be read by the host through the system interface 100.

The registers included in this embodiment are shown in Table 1 Status and Results Registers. Note that the inclusion registers in this table does not limit the embodiment to this list of registers.

TABLE 1

| Name | Description |
| --- | --- |
| Incoming Component | This register holds the current "component" of the incoming vector that is being compared against the stored vector. |
| Feature Masks | Holds the mask bits/bytes for the masking of the corresponding bits/bytes for consideration in the distance calculations. |
| NSP/VCAM Criteria | The value to be used in register comparisons that determine the state of the NSP and VCAM flags. |
| Distance | The results of the comparison between the incoming vector and the vector stored in the neuron |
| Fired Counter | This register is incremented each time the neuron distance is within the specified threshold. |
| Category | Holds the value of the Category that this neuron is assigned to. |
| Context | Holds the value of the Context that this neuron is assigned to. |
| Closest Distance | Holds the smallest distance that has been calculated across a number of vector comparisons |
| Distance Threshold | The neuron is considered a "match" and "fires" if the calculated distance is <= to the contents of this register. |
| Threshold Minus Distance | Holds the absolute value of the difference between Threshold and Distance Register values. |
| All Zeros Counter | Counts the number of Exact Match events. |
| Flags | Register containing all single bit flags |

Feature Vector Memory

The Feature Vector Memory (FVM) 1310 is a randomly accessible block of memory. In an embodiment, the FVM 1310 is constructed with SRAM; other memory technologies, either volatile such as DRAM or non-volatile technologies such as Flash are of course also applicable. The FVM 1310 of each neuron 1300 may be written to and read from by the host computer. During vector comparison calculations, the data in the FVM 1310 is sequentially output to the Math Unit 1311 to one side of the ALU, while the other side of the Match Unit 1311 ALU receives the incoming vector that is to be compared.

Neuron Math Unit

Math Unit 1311 serves multiple functions. The first of these functions is to calculate the difference between com- Results and Status Flags Each neuron has a number of flags, contained in the Status and Results 1306 block. These flags capture the occurrence of a particular event during the operation of the neuron. Each flag is a single bit, and can be set or cleared.

An example flag is the "Fired" flag. The Fired flag is set at the end of a neuron calculation when the resulting calculated distance is less than the Distance Threshold stored in the Status and Results Register 1306. Another flag is the "Committed" flag. This flag is set when the neuron FVM has been loaded with a feature vector. A neuron with its committed flag set is considered to be "committed", or in-use. Many flags may be implemented for a number of operations. The flag register includes the Exact Match flag, Fired flag, Uncategorized flag, Degenerated flag, Committed flag, New Closest Distance flag, VCAM flag, NSP flag, Category match flag, Context match flag, Learning flag, Distance Overflow flag, Exclude flag, AIF update flag, All Zeros flag.

Results Selection Logic

When the calculation operation of an incoming vector and the stored Feature Vectors sets is complete, the control Logic Block 105 initiates a search and sort operation of results from the participating neurons. This search and sort operation is in turn controlled by the Search and Sort 107 block. Neurons having their NSP and VCAM results flags set participate in the search and sort. The host computer can choose which results register to use for these operations; typically, the Distance Register is the source, but other results registers may be used.

Neuron Selective Participation

During vector comparison operations, it is often desirable to perform operations on a sub-set of the neurons in the array. These operations may include calculating distances from an incoming vector, resetting neuron results registers, placing the neurons back into the available neuron "pool", among others. In an example of such an operation, a sub-set of the neurons may be associated with a particular type of vector, referred to as a "context". If the neuron array 101 contains feature vectors that define types of cats and types of dogs, then neurons associated with cats will be assigned to a first context, and neurons associated with dogs with a second context. The context register in Status and Results Registers 1306 will store a value representing the appropriate context associated with the feature vector stored in the FVM 1310. Sub-categories of cats and dogs may result in the feature vectors related to these sub-categories holding a value in the Category register in Status and Results Registers 1306. If it is known that the incoming vector is a cat, and the goal is to determine the type, or category of cat, then it is desirable to limit the comparison of the incoming vector to feature vectors that are associated with the cat context. The host will issue commands to Logic Block 105 that set the NSP flag for neurons that have a context equal to the value associated with cats. During the comparison of the incoming vector, in this example, the neurons holding the cat context feature vectors are included during the comparison, and the neurons holding the dog category feature vectors will be excluded. This provides several benefits, such as lower power consumption due to fewer neurons actively calculating the difference between the incoming vector and the neuron's FVM 1310, and higher performance due to fewer false positive results to analyze.

In a second example, it may be desirable to limit participation of neurons in the calculation process to those that meet a minimum distance threshold. Often, distance is a determination of closeness to a cluster center, and neurons that are further from the cluster center may not be of interest. In this scenario, limiting participation to neurons of a minimum distance enables faster performance, as it removes from consideration and analysis neurons that are in the same category, but not close enough to the center cluster to be of interest.

Neuron Virtual Cam

Content Addressable Memories (CAMs) typically allow the host to provide data to the CAM device, and then the CAM device will return the address of the memory location where the data is stored. Neurons are similar to CAMs in that a set of data, the incoming feature vector, is presented to the neural network chip for comparison to the stored feature vectors. After calculation of the difference between the incoming and stored feature vectors, the neural network chip, or system of chips, returns unique IDs of neurons that are most similar to the incoming feature vector. These unique neuron IDs are similar to the data address that a CAM will return.

To facilitate high-speed location of neurons that have met a specific set of criteria, circuitry is disclosed that allows the host to sequentially read the unique nueron IDs (similar to a CAM address) of the neurons that met the criteria. For example, the host may submit a feature vector for comparison to the feature vectors stored in each neuron. After the comparison calculation, the host may simply ask for the unique neuron ID of the closest match (distance), or the host may provide further specificity and ask that any neuron for which the calculation resulted in a distance value of less than 20 should participate in the sequential unique nueron ID read operation. VCAM chain 1208 of FIG. 12 and NSP and VCAM Logic 1303 of FIG. 13 provide the ability for the host to read a set of unique nueron IDs from any number of matching neurons, located anywhere within the chip or system of chips, without loss of speed.

NSP and VCAM Architecture

VCAM Chain

The VCAM Chain 1208 of FIG. 12 is a neuron-to-neuron connection that is used to enable the host to sequentially, that is one by one in order, read specific data such as the unique nueron ID from neurons that have met specific criteria and have their NSP and VCAM flags set. To sequentially output data on the Global Address and Data Bus 1302, neuron NSP and VCAM Flag Logic 1303A is used to determine if the neuron have first met the specific criteria via the NSP and VCAM flags, while VCAM Read Logic 1303B determines if the neuron should drive its data on to the Global Data Bus 1301.

NSP and VCAM Flag Logic

Figure 14:
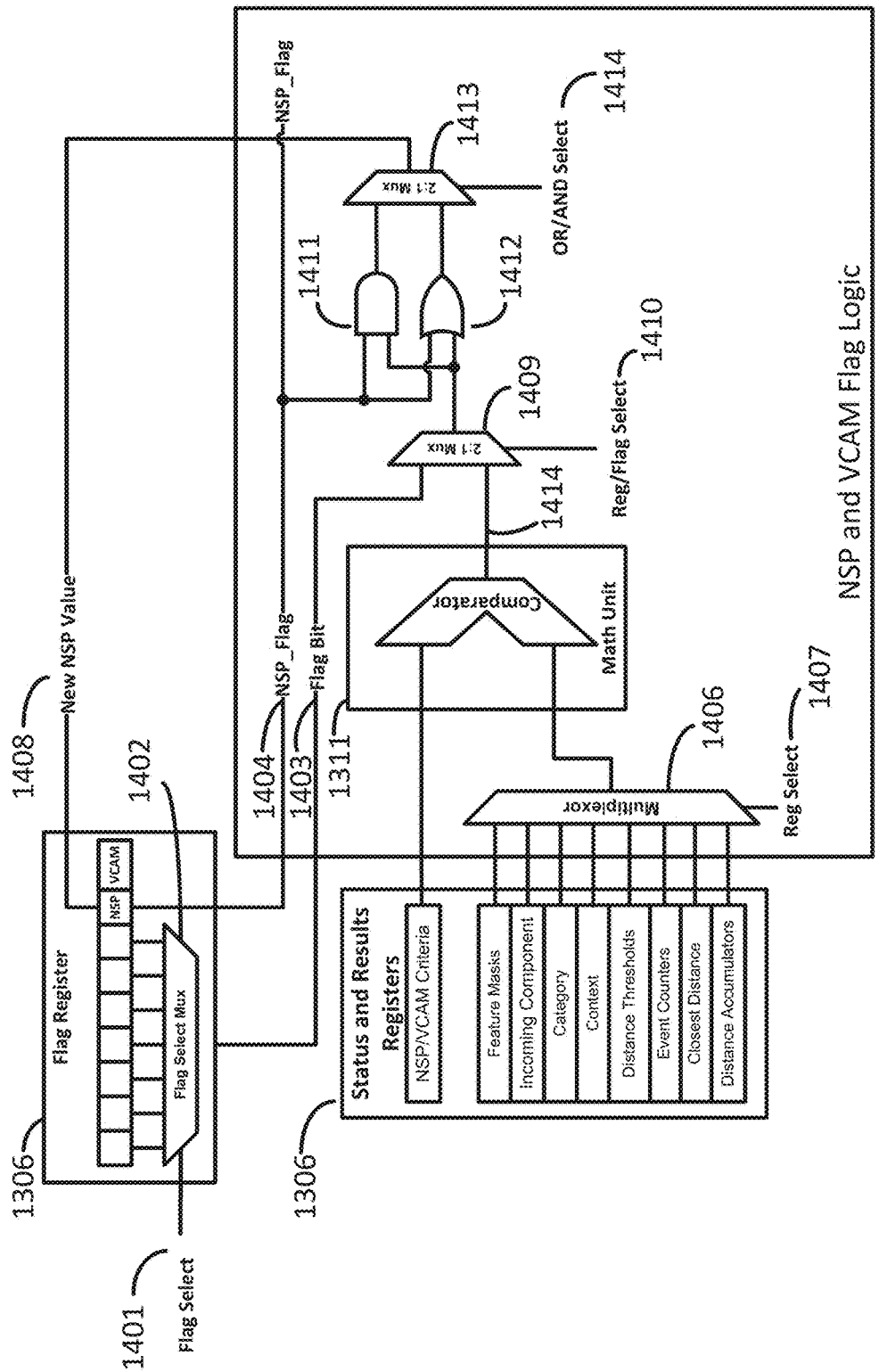
FIG. 14 is a diagram of circuitry for determining Neuron Selective Participation (NSP) in calculations, according to an embodiment.
Figure 15:
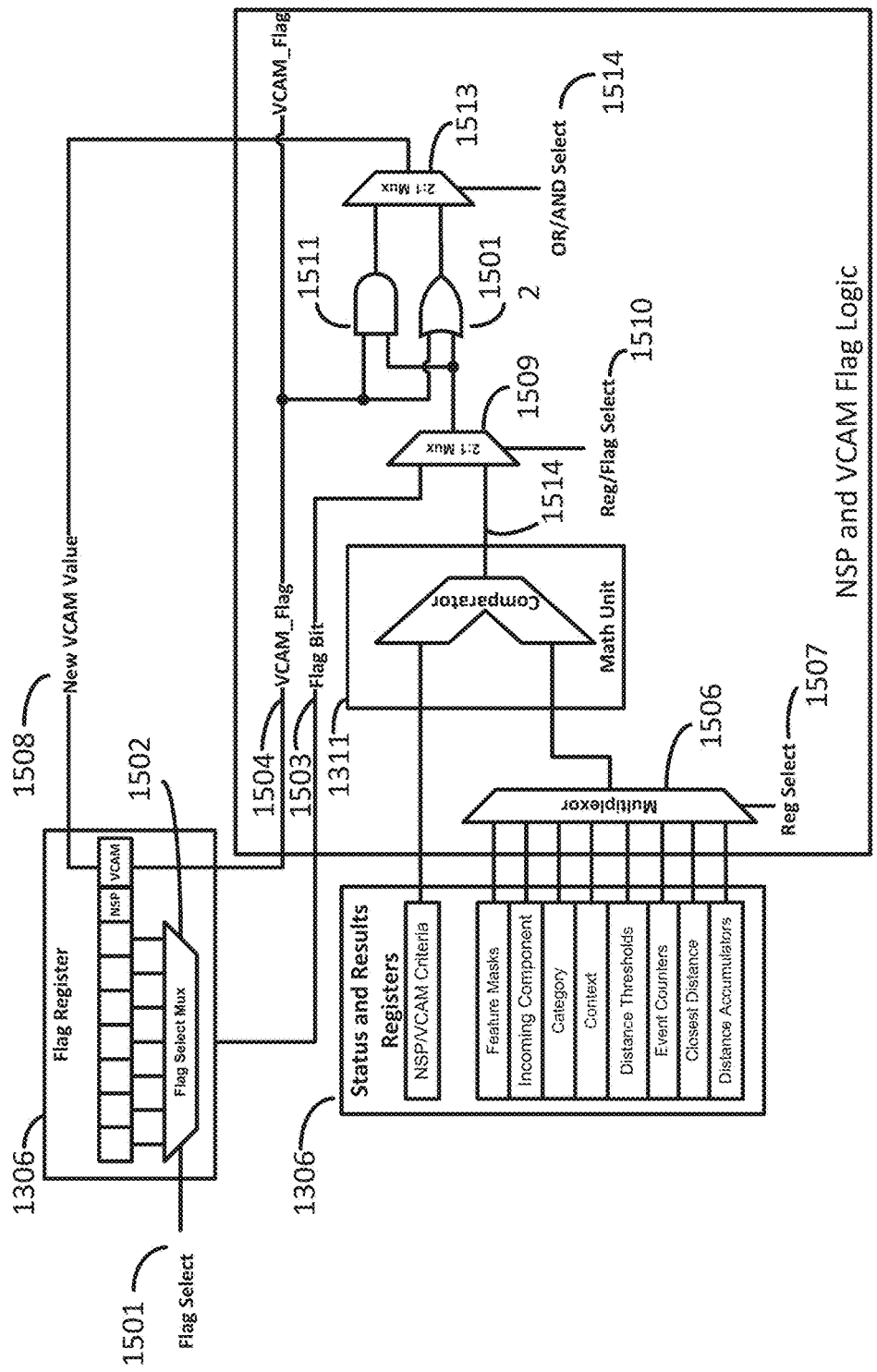
FIG. 15 is a diagram of circuitry for determining Virtual CAM participation, according to an embodiment.

FIG. 14 is a logic diagram for the NSP and VCAM Flag Logic 1303B. This diagram shows only the logic for the NSP flag; the logic for the VCAM flag is similar in design and function. This logic is used to set the NSP and/or the VCAM flag in response to one or more logic tests. These logic tests are comparisons between provided criteria written to the NSP/VCAM register in the Status and Results Register 1306 and a second register in the Status and Results Register 1306. For example, the comparison can be specified to be between the NSP/VCAM register and the Fired Counter register to determine if the neuron has met a minimum number of successful comparisons to incoming vectors. The Fired Counter is incremented each time that an incoming vector is compared to the neuron, and the difference between the incoming vector and the feature memory of the neuron is within a threshold; this threshold value is also stored as a register in the Status and Results Register 1306. Alternately, the logic tests may also be simple logic tests of the state of a flag in the Flag Register in the Status and Results Register 1306. The comparisons take the form of a logic expression such as "If Event Counter value is less than NSV/VCAM Criteria then NSP_Flag=1". Multiple compound logic tests may be performed and the results stored in the NSP Flag or the VCAM flag by simply executing the tests in a correct sequence.

To perform the comparisons, a value for comparison is first written to the NSP/VCAM Criteria register in the Status and Results Register 1306. This value may be written by the host or by the Logic Block 105. Flag Select 1401 is set to select either the NSP or VCAM flag from the Flag Register contained in the Status and Results Registers 1306. Register Select 1407 is set to select the register from the Status and Results Registers 1306 for comparison to the NSP/VCAM Criteria.

The NSP/VCAM Criteria is submitted to a first comparison into the Math Unit 1311 comparator, while the selected register for comparison is input to a second input. The output of the Math Unit 1311 comparator is connected to a first input of a 2-to-1 multiplexor 1409, the second input of which is connected to the output of the Flag Select multiplexor. If the logic test is a simple flag test, then the 2-to-1 multiplexor 1409 connects the Flag bit selected by Flag Select 1401 to the AND 1411 and OR 1412 gates.

The logic function to be performed, AND or, is determined by the OR/AND Select 1414 signal. If the test is a comparison between registers, then the Reg/Flag Select 1410 signal connects the output of the Math Unit 1311 comparator to the AND 1411 and OR 1412 gates. The output of the OR 1412 and 1411 gates are connected to a second 2-to-1 multiplexor 1413. The output of this multiplexor is the new value for the NSP or VCAM flag, and will be written into the NSP or VCAM register during a following clock cycle.

After the completion of the comparison or test, the NSP and VCAM bits are ready for either another comparison or test, to be used as the participation selection of upcoming operations, or to be used in a sequential read operation.

VCAM Read Logic

Figure 16:
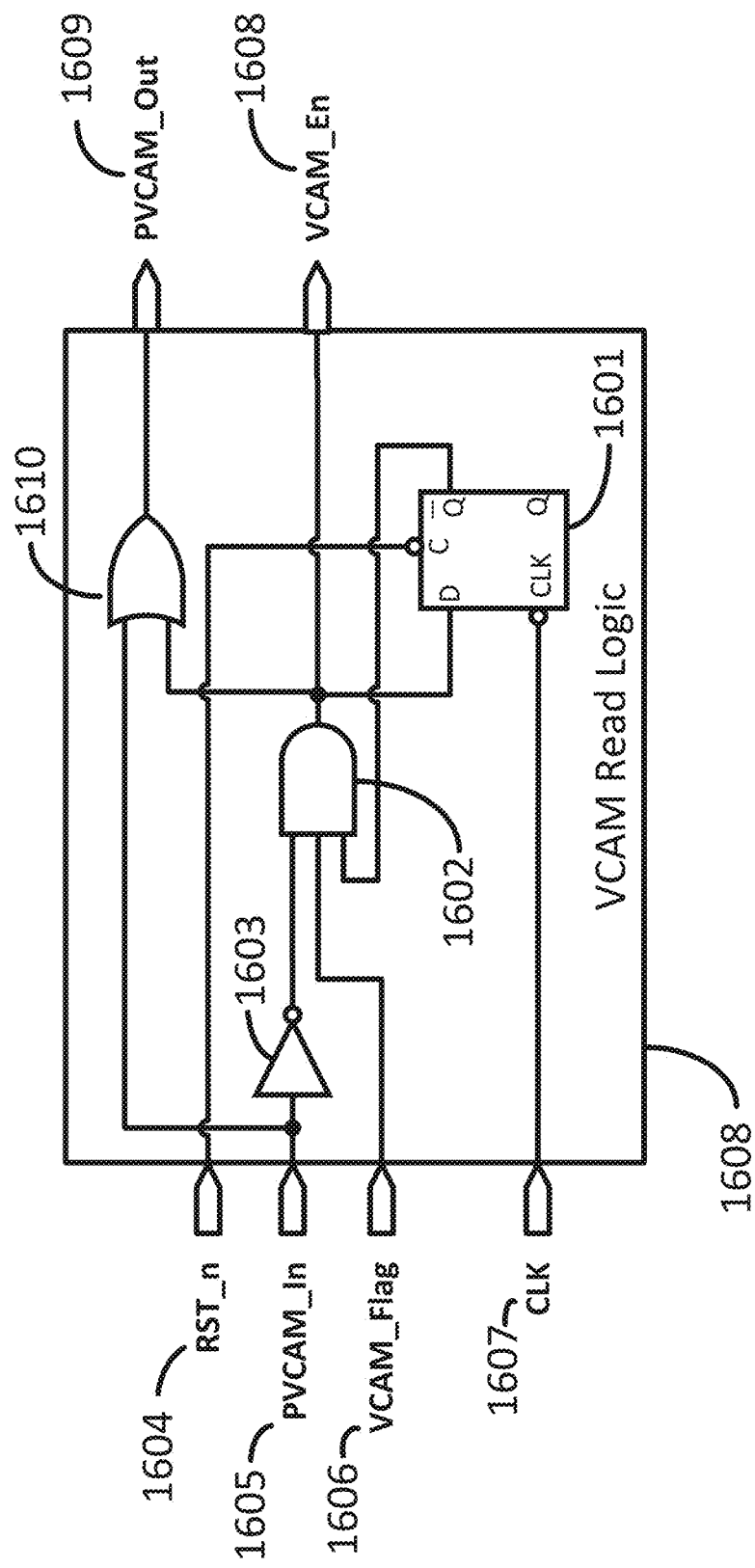
FIG. 16 is a diagram of the VCAM chain logic that is used to selectively read the Unique IDs of only neurons that have met specific criteria, according to an embodiment.

FIG. 16 diagrams the VCAM Read Logic 1600 that is used to determine when a neuron should output its data to the Global Data Bus 1301 in response to a sequential read. Inputs RST_n 1604 and CLK 1607 are global signals connected to all neurons. Output signal VCAM_En 1608 is used by Bus Interface Logic and Drivers 1303 to allow the neuron to drive its specified data on to the Global Data Bus 1301. Input PVCAM_In 1605 is connected to the VCAM_En 1608 output from the previous neuron in the VCAM Chain 1208 of FIG. 12, and indicates that one or more neurons in the chain prior to this neuron must be read before the this neuron is able to output its data. Output PVCAM_Out 1609 carries the VCAM chain onwards to the next neuron, and is the logical OR of PVCAM_In 1605 and VCAM_En. Thus, if any neuron prior to this neuron in the chain has its VCAM flag set, the previous neuron will take precedence, and the PVCAM signal is propagated through all neurons in the chain. Input VCAM_Flag 1606 is connected to the VCAM Flag from this neuron's Flag Register. If a previous neuron in the VCAM Chain 1208 of FIG. 12 needs to output its data, and has not yet done so, then the current VCAM_En 1608 signal is held inactive by the combination of inverter 1603 and gate 1602.

After all neurons prior to this neuron in the chain have completed outputting their data, the signal PVCAM_Flag becomes inactive. If this neuron has its VCAM_Flag set, which indicates that the neuron is first participating in the prior operations, and second that a test or comparison has resulted in the VCAM flag being set, then the output of NAND gate 1602 VCAM_En 1608 will become active, and during the next read cycle this neuron's data will be output to the Global Data Bus 1301. In one embodiment, VCAM_En signal will stay active for only one clock cycle, as the latch 1601 will capture the VCAM_En signal state on the next clock, which will set the VCAM_En signal inactive again.

The input signal RST_n 1604 clears the latch 1601 for all neurons in preparation for a new VCAM Read Sequential operation.

NSP and VCAM Commands

The NSP and VCAM flags in each neuron control the response of the neuron to the neuron operations during vector calculations, control the participation of the neuron in Results Search and Sort, and also determine if the neuron responds to neuron array Broadcast operations. Broadcast operations are used to write to a first category of participating neurons, that is neurons that have their NSP flag set. These Broadcast operations are known as the NSP Broadcast operations, and include operations that can, for example, reset specific registers in all participating neurons, write a value to a register in all participating neurons, read the unique nueron ID of all participating neurons, and write to Feature Vector Memories.

The VCAM flag, in conjunction with the NSP flag, is also use to further sub-divide the neurons that participate in Broadcast operations. The types of operations that are performed on these neurons is the same as the NSP flag-enabled neurons, with the clarification that the both the VCAM and NSP flags must be set to selectively operate on this sub-set of neurons.

The NSP and VCAM capabilities can be used to find neurons that have flag(s) set or cleared, find neurons that have a register that matches or does not match the specified data, enable a sub-set of neurons for further operations, further refine the sub-group through additional VCAM logic testing.

VCAM Chain Delay Reduction

Figure 17:
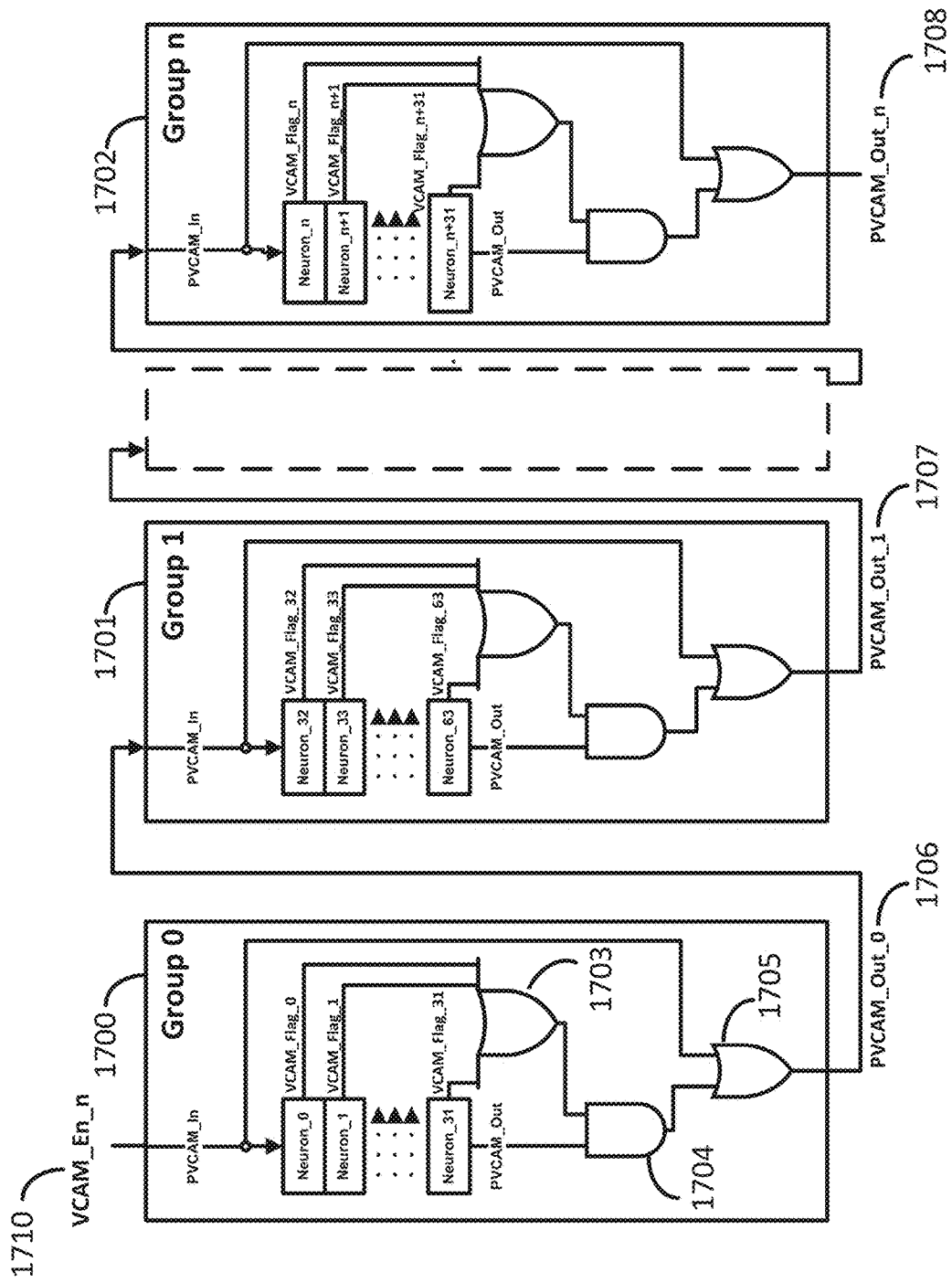
FIG. 17 is a diagram of Chain Delay reduction that is used to minimize the delay of the VCAM Chain within a single chip, according to an embodiment.

To achieve high frequency performance using the VCAM daisy chain logic requires partitioning of the neurons into sub-groups, and then collating the results from each sub-group. FIG. 17 is a diagram of a VCAM chain delay reduction demonstrating a method for collating the VCAM daisy chain in groups of 32 neurons.

Beginning with neuron group 1700, the VCAM_Flag signal from each neuron is "collected" by a large OR gate 1703. Further, the PVCAM_Out 1609 signal of each neuron in group 1700 is connected to the PVCAM_In 1604 signal of the next neuron. The last neuron in the chain has its M_Out 1609 signal connected to one input of AND gate 1704, the other input which is connected to the PVCAM_Out 1604 of the last neuron in the group 1700. Thus any neuron in this group that has its VCAM_Flag set will keep the group PVCAM_Out_0 1706 asserted. This has the effect of "disabling" the following neuron groups until all neurons in group 1700 have output their VCAM results. OR gate 1705 is required in the event that there are no neurons in the block that have the VCAM_Flag set, yet there are neurons in previous blocks that do have their VCAM_Flags set.

At the beginning of a VCAM results read, input signal VCAM_En_n 510 becomes active (low) and the sequential read process begins, with each neuron in block 1700, having its VCAM_Flag set, outputs its results. The results are output in sequence of the connection of the neurons; in this example Neuron 0, if its VCAM_Flag is set, will output its results to the Global Data Bus 1301 first, and then effectively pass control to the next neuron in the group 1700 that has its VCAM_Flag set. If no other neuron in group 1700 has its VCAM_Flag set, then the group PVCAM_Out_0 is de-asserted and control is passed to the next group 1701. This cascading of VCAM results continues through all groups, and neurons within the groups, until the last group 1702 is reached.

This technique effectively creates a parallel chain in each block that does not directly impact the VCAM chain delay. The delay is limited to the OR 1703, OR 1705 and 1704 logic gates. In this embodiment, neurons have been collected into groups of 32 neurons. It will be obvious to one trained in the arts that any number of neurons may be grouped, and additional techniques such as latching the group PVCAM_Out signals may be employed to improve the performance of the neuron chain.

Multi-Chip Results Aggregation

In a system containing an array of neural network chips, locating the neuron with the desired result can consume significant time, if for example the host must query each chip individually for its search and sort result, and then the host must sort the list of results. To facilitate the rapid sorting of the results and identification of the neuron having said results, this embodiment implements a novel tree-like results aggregation and neuron identification scheme.

In FIG. 1, neural network chip 100 contains a Search and Sort 107 block that sorts the neuron results or other selected data, as specified by the Configuration Table 103A, in an ascending or descending order; the direction of sorting is also specified by the Configuration Table 103A. Results and Signal Aggregation Interface 104B contains interface signals and logic that connect to neighboring neural network chips in a system containing an array of neural network chips.

Figure 18:
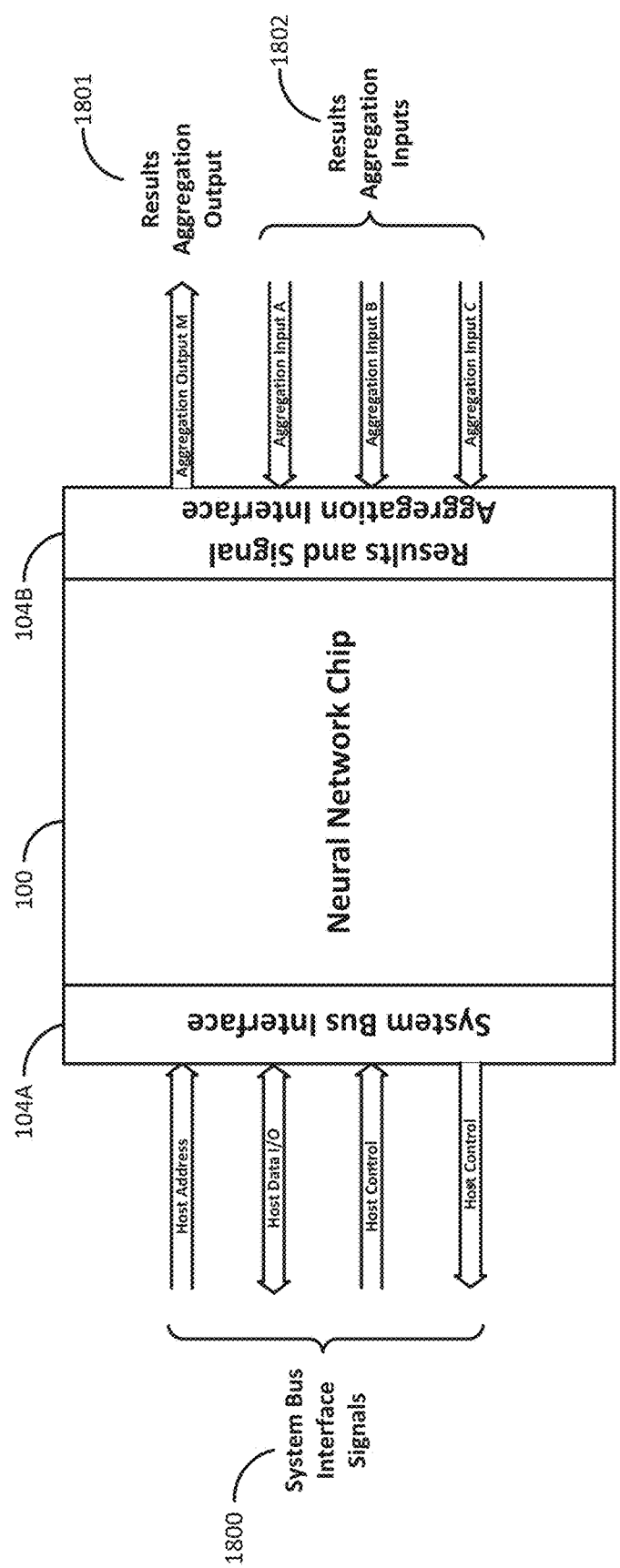
FIG. 18 is a diagram showing the Signal Busses for the System Bus Interface and the Results and Signal Aggregation Interface, according to an embodiment.

FIG. 18 is a diagram of neural network chip 100 with System Bus Interface (SBI) 104A signals 1800 and Results Aggregation Interface (RAI) 104B. In this embodiment, the RAI is built with four ports. Three ports, labeled Aggregation Input A, B, and C collect results from neural network chips, while port Aggregation Output M provides aggregated results to a neural network chip. It will be clear to one trained in the arts that any number of ports may be used.

The results that are collected from each neural network chip 100 includes the result data, the Unique ID of the neuron containing the result, and the Unique ID of the neural network chip 100 that contains the neuron. This provides the information necessary for the host to immediately access the neuron as required for algorithm analysis. In the following descriptions, the neuron containing the result that was identified by the Search and Sort 107 block will be referred to as the "winning" neuron.

Figure 19:
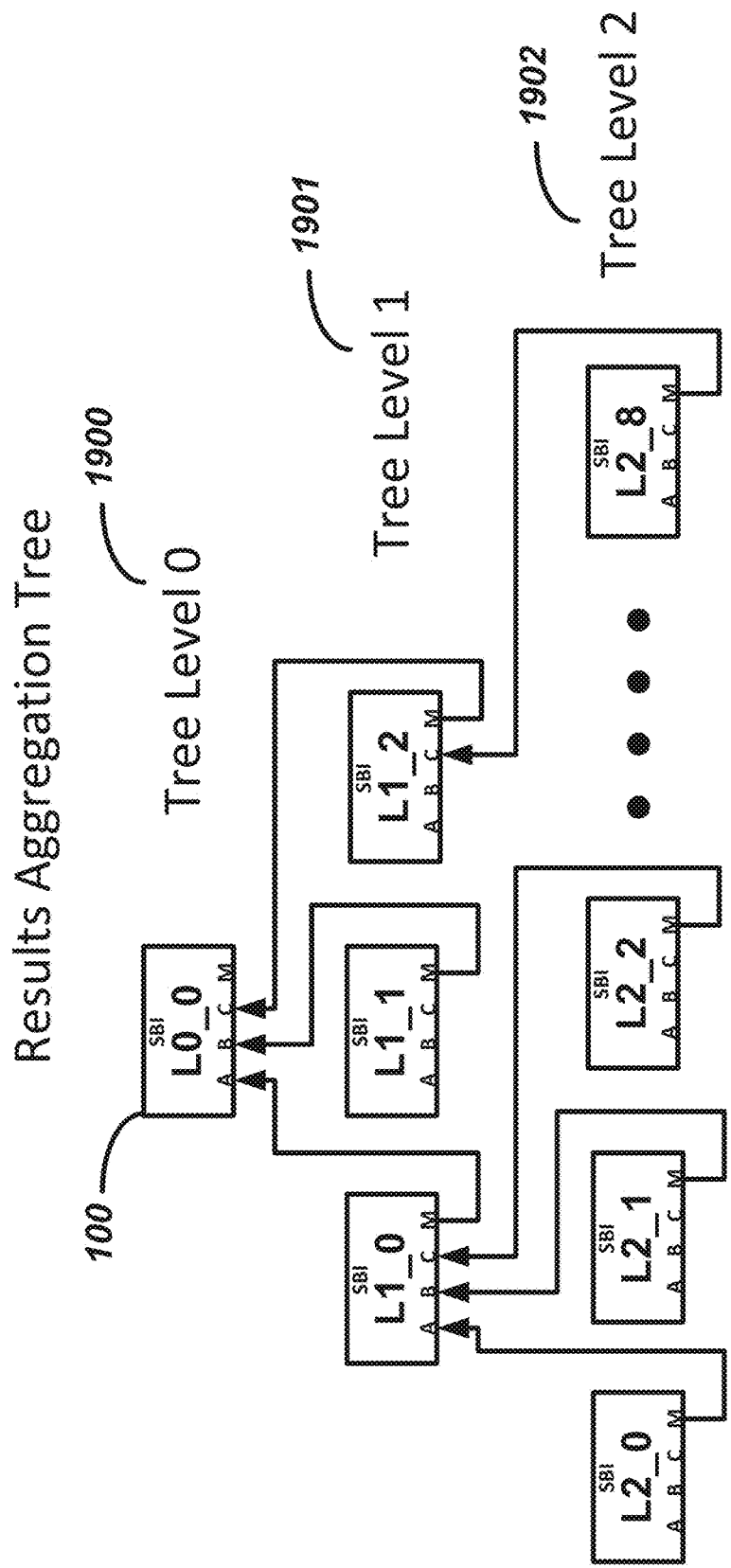
FIG. 19 is diagram showing an example of a Results Aggregation Tree, according to an embodiment.

FIG. 19 is a diagram of an array of neural network chips 100 connected in a "tree" structure. Tree Level 0 1900 is the "top" of the tree, accepting inputs from the A, B, and C ports of the neural network chips Tree Level 1 1901 in the next level "down". Tree Level 2 1902 is the "bottom" tree level shown in this diagram; only 4 neural network chips 100 are shown in this for brevity. Also, only three Tree Levels are shown here, again for brevity; the number of levels in the tree is not limited.

Neuron operations in all participating neurons in a network of neural network chips begin simultaneously as the result of a command that is broadcast to all neural network chips at the same time. At the completion of the specified neuron operation and corresponding search and sort operation, each chip in Tree Level 2 1902 presents its "winning" results data on its Aggregation Output M 1802 port to a results input port on a neural network chip 100 in Tree Level 1 1901. Results comparison logic in the neural network chip 100 selects the smallest or largest value from among the A, B, C results inputs and its own local results, and presents the selected winning result to the neural network chip 100 in Tree Level 0. The neural network chip 100 at the "top" of the tree, which is Tree Level 0 1900, selects the smallest or largest result from the input Ports A, B, and C and its own local results.

Figure 20:
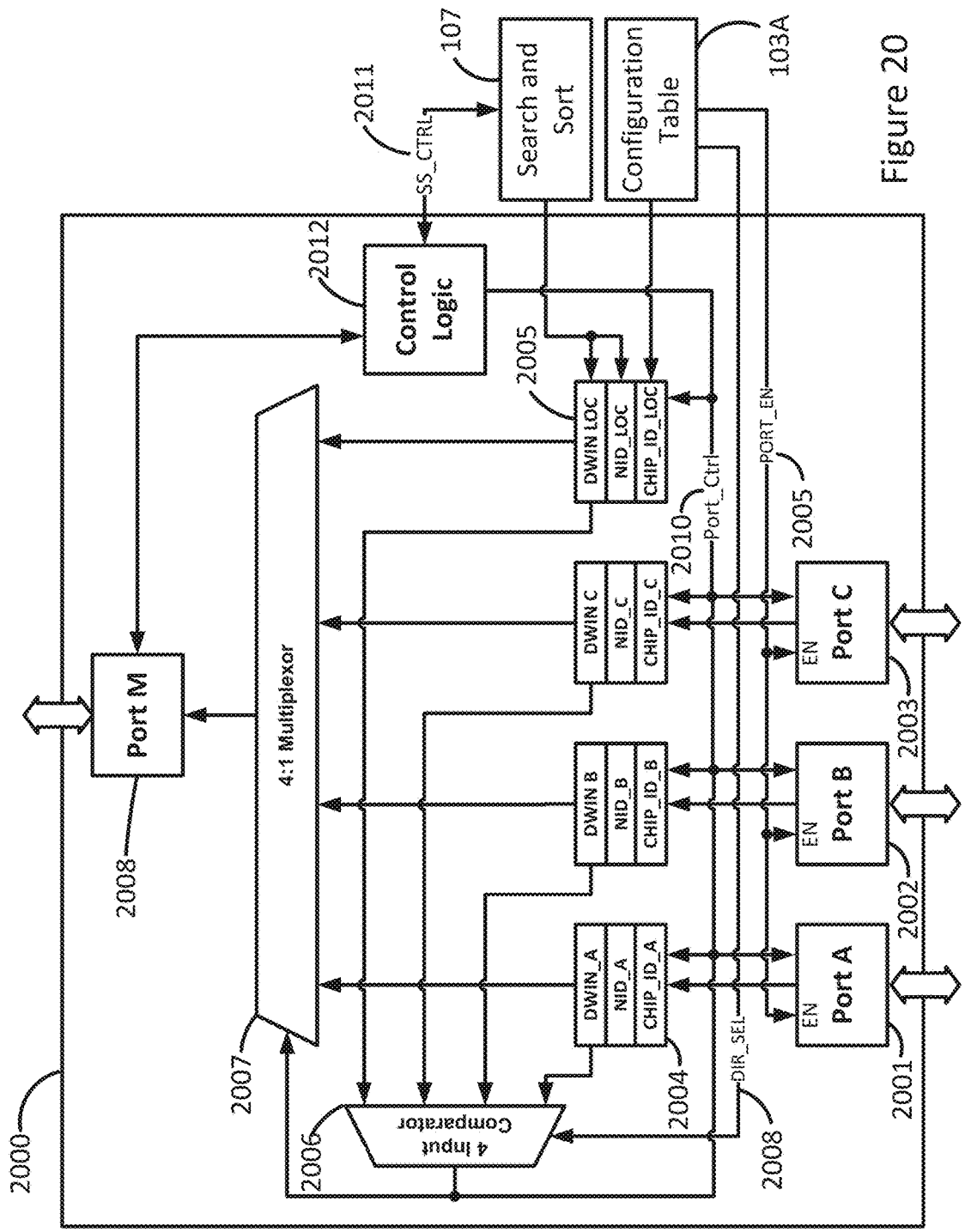
FIG. 20 is a diagram of the logic blocks and registers in the Results Aggregation logic block, according to an embodiment.
Figure 21:
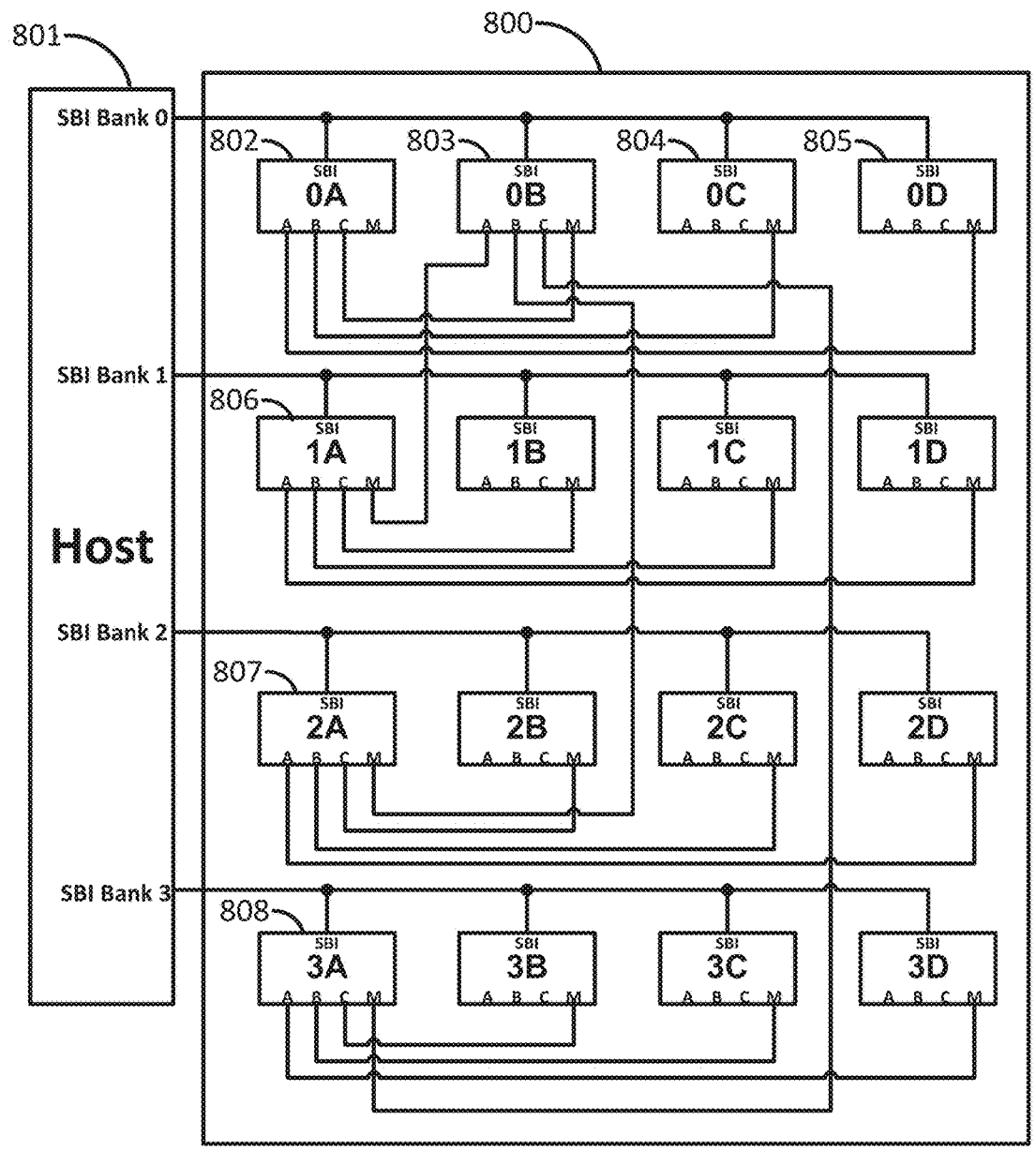

FIG. 20 is a block diagram of the RSAI 104B block. Results Logic 2000 block takes four results as input and chooses either the largest or smallest of the inputs to pass to the outputs. Ports A 2001, B 2002, and C 2003, and the Search and Sort 107 block provide their respective winning results and associated data to a set of results register 2004 that are associated with each port and the local search and sort 107 results. In one embodiment, initially only the DWIN (Data, Winning) values are collected in the results registers 2004 associated with each port and the local Search and Sort 107 register. In one embodiment, the Neuron ID and Chip ID information is only received if the port is declared as the "winner" by the Control Logic 2012, and the RWIN signal (Table 2) is asserted for the winning port.

In one embodiment, the four-input comparator 2006 input receives data from the DWIN registers. The four-input comparator 2006 chooses either the smallest or largest of the DWIN values based upon the DIR SEL 2008 signal from the Configuration Table 103A. The output of the four-input comparator 2006 is also connected to the Control Logic 2012.

During Results Aggregation, the smallest or largest DWIN value is connected to the Port M 2008 through the 4:1 multiplexor which is under the control of the Control Logic 2012 and 4 input comparator 2006. The selected Port M 2008 DWIN value is presented to a neural network chip in the next level up in the tree. This next level chip collects the DWIN inputs from each lower level chip; if one of the inputs to this higher level chip is small or larger than other inputs or the local DWIN results, then the higher level chip collects the remaining information associated with the winning value; the Neuron ID and the Chip ID. This effectively "empties" this input "slot"

When the RWIN signal is asserted on Port A, B, or C, the chip receiving the RWIN signal presents the winning Neuron ID and Chip ID to the chip that asserted the RWIN signal. The Neuron ID and Chip ID are stored in the appropriate results register 2004.

If the winning neuron was located on the chip receiving the RWIN signal, then the search and sort logic 107 of the chip receiving the RWIN signal will remove the winning neuron from further results consideration through the setting of a flag in the neuron Status and Results Register, and then begin another search to locate the next smallest or largest result in its internal array of neurons. Once this next distance is located, the winning results data is compared to the other input ports, and again the winning results data is presented to the M Port 2008.

If the winning neuron is located on one of three chips connected to its Port A, B or C, which are connected to the chips lower in the tree hierarchy, then the Neuron ID and Chip ID from the winning chip is transmitted via the M Port 2008, and the lower level chip removes the winning neuron from consideration begins an internal search for the next winning value.

In the event that more than one of the DWIN values contain a duplicate winning value, the 4 input comparator 2006 will choose a first value from the RAI Input Ports in logical sequence; Port A will be selected before Port B, Port B will be selected before Port C, and Port C will be selected before the local Search and Sort results.

In the event that more than one of the DWIN values contain a duplicate winning value, the 4 input comparator 2006 will choose a first value from the RSAI Input Ports in logical sequence; Port A will be selected before Port B, Port B will be selected before Port C, and Port C will be selected before the local Search and Sort results.

The previous paragraphs have described an architecture for searching and sort for "best matches" between an incoming vector and the feature vector stored in each participating neuron in a system with a plurality of neural network chips. This same searching and sorting mechanism also accepts as input any register from the Status and Results Registers 1306. This enables, for example, a search and sort for the neuron with the largest Fired Counter Register value, thus enabling locating the neuron that has best matched ("fired") the incoming vectors the most times.

This approach provides a significant performance advantage, in that as soon as a winner in any chip in the tree has been identified and the results transferred to the next layer in the tree, the winning chip immediately begins an internal search for its next winning value. This architecture has the impact of providing results quickly, as the winning chip is immediately tasked with finding its internal next value while the tree is evaluating the next results.

Another advantage of this approach architecture is energy savings. At the beginning of the search for the best match in the array of neural network chips, all chips perform an internal best match search, and then use that value with their associated Port A, B, and C to present a best match on their Port M. Only the neural network chip that is declared a winner, and provides its results, Neuron ID, and Chip ID to the upper level chip in the tree, will begin a search for its next-best match; all other chips in the network are essentially idle unless they have been declared a winner. This minimizes the activity of the neural network chips in the array, thus saving energy.

Table 2 lists the signals for the RSAI output Port M 2008, while Table 3 lists the signals and definitions for the RSAI input Ports A 2001, B 2002, and C 2003.

TABLE 2

Aggregation Output Port "M"

| Signal | Direction | Description |
| --- | --- | --- |
| DO[0:7] | Out | Data bus carrying Results Data, Neuron ID, and Chip ID |
| DVALID | Out | Indicates that data on the M Port is valid |
| DACC | In | Input from device higher in network that data has been accepted |
| RWIN | In | Input from device higher in network that either this chip or one below it in the network had the best result |

TABLE 3

Aggregation Input Ports "a", "B", and "C"

| Signal | Direction | Description |
| --- | --- | --- |
| DO[0:7] | In | Data bus carrying Results Data, Neuron ID, and Chip ID |
| DVALID | In | Indicates that data on the lower level M port is valid |
| DACC | Out | Output to the device lower in the network that data has been accepted |
| RWIN | out | output to the device lower in network that either this chip or one below it in the network had the best result |

Although an embodiment has been described whereby the Results Aggregation Bus is a parallel bus having a number of signals, it should be obvious to one trained the arts that any type of communication interface, including low or high speed serial busses may be used to implement the architecture.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A nonlinear neuron classifier comprising:
   a neuron array that comprises a plurality of neurons that have variable component length and variable depth, and that processes an input vector of variable component length and variable component depth that is input into the classifier for comparison against vectors stored in the classifier;
   a system bus interface configured to detect and capture the input vector;
   logic that is connected in parallel to individual neurons in the classifier and that broadcasts the input vector concurrently to neurons that store vectors of similar component length and depth, for vector calculations; and
   storage configured as internal status and results registers that are accessible by hardware external to the classifier, the status and results registers comprising a combination of registers of varied length configured to store each of the plurality of neurons relating to at least one context.

2. The nonlinear neuron classifier of claim 1 further comprising storage configured as internal local status and results registers that are accessible by hardware external to the classifier, wherein the local status and results registers comprise a combination of registers of varied length configured to store results of vector calculations, and wherein each of the plurality of neurons relates to at least one context.

3. The nonlinear neuron classifier of claim 2 wherein the input vector is of a known context, a first plurality of the plurality of neurons relates to the known context and other neurons of the plurality of neurons relate to contexts other than the known context, wherein control logic sets a Neuron Selective Participation (NSP) flag for the first plurality of neurons, the NSP flag indicating that only the first plurality of neurons are to be selected for participation in the vector calculations.

4. The nonlinear neuron classifier of claim 3 wherein the control logic sets the NSP flag by a write command.

5. The nonlinear neuron classifier of claim 3 wherein each neuron has at least one of static information comprising context and category information, and dynamic information comprising vector calculation results, the control logic receives criteria from a user, the criteria comprising the vector calculation results of vectors for which the NSP flag has been set, and the control logic uses the user criteria to identify only the neurons for which the NSP flag has been set and that meet the vector calculation results.

6. The nonlinear neuron classifier of claim 3 wherein the NSP flag is set based on the results of a comparisons of a plurality of pairs of multi-bit registers, or based on testing a flag bit.

7. The nonlinear neuron classifier of claim 6 wherein the comparison of the plurality of pairs of multi-bit registers comprises a first set of multiple mathematical comparisons and the flag bit comprises the current state of the NSP flag determined from previous results of mathematical comparisons.

8. The nonlinear neuron classifier of claim 6 wherein the input vector is broadcast for vector calculations with vectors associated with neurons having the NSP flag set, and the vector calculations are completed.

9. The nonlinear neuron classifier of claim 8 wherein a Virtual Content-Addressable Memory (VCAM) flag is set based on the results of comparisons of a second plurality of pairs of multi-bit registers, or based on testing a second flag bit.

10. The nonlinear neuron classifier of claim 9 wherein the comparison of the plurality pairs of multi-bit registers comprises a first set of multiple mathematical comparisons and the flag bit comprises the current state of the VCAM flag determined from previous results of mathematical comparisons.

11. The nonlinear neuron classifier of claim 9 wherein neuron IDs are provided to users based on the setting of both the NSP flag and the VCAM flag in neurons.

12. The nonlinear neuron classifier of claim 9 wherein the value of distance registers are provided to users based on the setting of both the NSP flag and the VCAM flag in neurons.

13. The nonlinear neuron classifier of claim 9 wherein at least some of the plurality of neurons are arranged in groups of N neurons connected serially for outputting data to a data bus from at least some of the groups of N neurons, wherein the serial connection of groups include at least a prior group and a subsequent group in the serially connection of groups, wherein a VCAM flag signal from the prior group indicates that the prior group has data to output, and wherein the VCAM flag signal from the prior group is configured to prevent readout of data from the subsequent group until the prior group has completed outputting its data to the data bus.

14. The nonlinear neuron classifier of claim 13 wherein the groups of N neurons read out data according to a system clock wherein a first clock signal enables readout of data from the prior group and a second clock signal resets the VCAM flag signal of the prior group.

15. The nonlinear classifier of claim 1 wherein the neuron array comprises a plurality of neural network chips each comprising a plurality of neurons, at least one input port and at least one output port, each chip comprising a search and sort function, the plurality of neural network chips being arranged in a plurality of tree levels comprising an arrangement of lowest tree level to highest tree level, wherein the at least one input port of each chip in a higher level is configured to collect results of vector calculations from the outputs of chips in a lower level, and wherein after completion of a vector calculation the search and sort function of each chip in the array finds the neuron in the chip having the closest or the exact match results of the vector calculation and provides, via its output port, to an input port of a chip at the next higher tree level, the search and sort result of said neuron having the closest or the exact match result, wherein said chip at the next higher tree level selects the neuron having the closest or the exact match result from among the at least one input port of said chip at the next higher tree level and the result of the search and sort function of said chip at the next higher tree level, until the chip at the highest tree level selects the neuron with the closest or the exact match result from among the at least one input port of said chip at the highest tree level and the result of the search and sort function of said chip at the highest tree level, and wherein said chip at the highest tree level receives a neuron address of the neuron having the closest or exact match result that is selected by the chip at the highest tree level and presents at least the result of the closest or exact match result for storage in a storage device that is accessible by hardware external to the classifier.

16. The nonlinear classifier of claim 15 wherein the neuron identification (ID) of the neuron having the closest or exact match result, and the chip ID that is associated with said neuron having the closest or exact match result, is presented for storage in the storage device that is accessible by hardware external to the classifier.

17. The nonlinear classifier of claim 15 wherein a chip in the array receives a signal indicating that its provided search and sort result was the closest or exact match result from the vector calculation and, responsive to receiving the signal, said chip in the array removes the neuron having the closest or exact match result from further results search and sort, and immediately begins another search and sort to locate the next closest or exact match result.

18. The nonlinear classifier of claim 15 wherein search and sort results are from a vector calculation comprising a mathematical comparison of the input vector and the contents of any register of the status and results registers.

19. The nonlinear classifier of claim 15 wherein the search and sort results are presented in one of ascending order or descending order.

20. The nonlinear classifier of claim 15 wherein the search and sort results are presented on a parallel busing having signals comprising a data function, a line valid function, and a winner function.

21. The nonlinear classifier of claim 15 wherein the search and sort results are presented on a serial bus that is designated as a high-speed serial bus.

\* \* \* \* \*

UNITED STATES PATENT AND TRADEMARK OFFICE
CERTIFICATE OF CORRECTION

| | | |
|---|---|---|
| PATENT NO. | : 9,747,547 B2 | Page 1 of 2 |
| APPLICATION NO. | : 15/003764 | |
| DATED | : August 29, 2017 | |
| INVENTOR(S) | : McCormick et al. | |

It is certified that error appears in the above-identified patent and that said Letters Patent is hereby corrected as shown below:

In the Drawings

On sheet 3 of 24, Fig. 2A, delete "STORED OR LEARNED VERTOR" and insert --STORED OR LEARNED VECTOR-- therefor On sheet 7 of 24, Fig. 6, Line 3, delete "DECODE." and insert --DECODE,-- therefor In the Specification In Column 2, Line 8, delete "Loc." and insert --L∞.-- therefor In Column 10, Line 65, delete "Status" and insert --State-- therefor In Column 11, Line 63, delete "Match" and insert --Math-- therefor In Column 12, Line 9, delete "1303," and insert --1301,-- therefor In Column 12, Line 21, delete "1034" and insert --1304-- therefor In Column 12, Table 1, Line 9, after "neuron", insert --.--

In Column 12, Table 1, Line 15, after "comparisons", insert --.--

In Column 12, Table 1, Line 21, after "flags", insert --.--

In Column 14, Line 29, delete "1302," and insert --1301,-- therefor

In Column 14, Line 37, delete "1303B." and insert --1303A.-- therefor

In Column 14, Line 58, delete "NSP_Flag==1"." and insert --NSP_Flag=1".-- therefor Signed and Sealed this
Twenty-eighth Day of April, 2020

Andrei Iancu
*Director of the United States Patent and Trademark Office*

CERTIFICATE OF CORRECTION (continued)
U.S. Pat. No. 9,747,547 B2

In Column 16, Line 37, delete "1604" and insert --1605-- therefor

In Column 16, Line 39, delete "M_Out" and insert --PVCAM_Out-- therefor

In Column 16, Line 41, delete "1604" and insert --1609-- therefor

In Column 16, Line 66, after "and", insert --AND--

In Column 18, Line 16, delete "DIR SEL" and insert --DIR_SEL-- therefor

In Column 18, Line 31, after ""slot"", insert --.--

In Column 18, Line 46, delete "M Port" and insert --Port M-- therefor

In Column 18, Line 50, delete "M Port" and insert --Port M-- therefor

In Column 19, Table 3, Line 1, delete ""a"," and insert --"A",-- therefor

In the Claims

In Column 22, Line 1, in Claim 15, after "nonlinear", insert --neuron--

In Column 22, Line 33, in Claim 16, after "nonlinear", insert --neuron--

In Column 22, Line 39, in Claim 17, after "nonlinear", insert --neuron--

In Column 22, Line 47, in Claim 18, after "nonlinear", insert --neuron--

In Column 22, Line 52, in Claim 19, after "nonlinear", insert --neuron--

In Column 22, Line 54, in Claim 20, after "nonlinear", insert --neuron--

In Column 22, Line 58, in Claim 21, after "nonlinear", insert --neuron--